(12) United States Patent
Aritsuka et al.

(10) Patent No.: US 10,936,377 B2
(45) Date of Patent: Mar. 2, 2021

(54) DISTRIBUTED DATABASE SYSTEM AND RESOURCE MANAGEMENT METHOD FOR DISTRIBUTED DATABASE SYSTEM

(71) Applicant: HITACHI, LTD., Tokyo (JP)

(72) Inventors: Toshiyuki Aritsuka, Tokyo (JP);
Kazushi Nakagawa, Tokyo (JP);
Kazuhisa Fujimoto, Tokyo (JP)

(73) Assignee: HITACHI, LTD., Tokyo (JP)

( * ) Notice: Subject to any disclaimer, the term of this patent is extended or adjusted under 35 U.S.C. 154(b) by 66 days.

(21) Appl. No.: 16/333,727

(22) PCT Filed: Feb. 28, 2017

(86) PCT No.: PCT/JP2017/007799
§ 371 (c)(1),
(2) Date: Mar. 15, 2019

(87) PCT Pub. No.: WO2018/158819
PCT Pub. Date: Sep. 7, 2018

(65) Prior Publication Data
US 2019/0272201 A1    Sep. 5, 2019

(51) Int. Cl.
*G06F 9/46* (2006.01)
*G06F 9/50* (2006.01)
(Continued)

(52) U.S. Cl.
CPC .............. *G06F 9/5094* (2013.01); *G06F 1/28* (2013.01); *G06F 9/50* (2013.01); *G06F 9/505* (2013.01);
(Continued)

(58) Field of Classification Search
CPC ... G06N 3/0445; G06F 16/337; G06F 9/5066; G06F 1/3287; G06F 16/24532;
(Continued)

(56) References Cited

U.S. PATENT DOCUMENTS

2003/0084157 A1* 5/2003 Graupner .............. G06F 9/5066
709/226
2009/0254660 A1* 10/2009 Hanson ................... H04L 12/10
709/226
(Continued)

FOREIGN PATENT DOCUMENTS

JP         09-265459 A2   10/1997
JP         2014-215764 A  11/2014
(Continued)

OTHER PUBLICATIONS

El-Zoghdy, S.F., et al., "A Multi-Class Task Scheduling Strategy for Heterogeneous Distributed Computing Systems," KSII Transactions on Internet and Information Systems, vol. 1o, No. 1, Jan. 2016, 19 pgs.
(Continued)

*Primary Examiner* — Tuan A Vu
(74) *Attorney, Agent, or Firm* — Volpe Koenig

(57) ABSTRACT

The data processing times of data processing nodes are heterogeneous, and hence the execution time of a whole system is not optimized. A task is executed using a plurality of optimal computing devices by distributing a data amount of data to be processed with a processing command of the task for the plurality of optimal computing devices depending on a difference in computing power between the plurality of optimal computing devices, to thereby execute the task in a distributed manner using the plurality of optimal computing devices.

14 Claims, 20 Drawing Sheets

COMPUTING PERFORMANCE OF EACH NODE
(WHEN OPTIMUM COMPUTING DEVICE IS SELECTED)

| [TB/s]  | TASK 1.1  | TASK 1.2 | TASK 1.3 | GEOMETRIC MEAN |
|---------|-----------|----------|----------|----------------|
| NODE 1  | 10 (FPGA) | 1.6(CPU) | 2(CPU)   | 3.2            |
| NODE 2  | 2(GPU)    | 0.8(CPU) | 2.5(GPU) | 1.6            |
| NODE 3  | 0.2(CPU)  | 0.4(CPU) | 0.5(CPU) | 0.3            |

DATA DISTRIBUTION TO EACH NODE
(OPTIMUM AMOUNT OF EACH TASK, GEOMETRIC MEAN RATIO)

| [GB]   | TASK 1.1 | TASK 1.2 | TASK 1.3 | GEOMETRIC MEAN |
|--------|----------|----------|----------|----------------|
| NODE 1 | 839      | 585      | 410      | 637            |
| NODE 2 | 168      | 293      | 512      | 318            |
| NODE 3 | 17       | 146      | 102      | 69             |

(51) Int. Cl.
  *G06F 16/27*  (2019.01)
  *G06F 1/28*  (2006.01)
  *G06N 3/04*  (2006.01)
  *G06F 11/20*  (2006.01)
  *G06F 16/335*  (2019.01)
  *G06F 16/2458*  (2019.01)

(52) U.S. Cl.
  CPC .............. *G06F 16/27* (2019.01); *G06F 9/46* (2013.01); *G06F 9/5066* (2013.01); *G06F 11/2043* (2013.01); *G06F 16/2471* (2019.01); *G06F 16/337* (2019.01); *G06N 3/0445* (2013.01); *Y10S 707/9994* (2013.01)

(58) Field of Classification Search
  CPC ............ G06F 9/30181; G06F 11/2043; G06F 9/5094; G06F 9/505; G06F 16/2471; G06F 16/27; H04L 12/10
  See application file for complete search history.

(56) References Cited

U.S. PATENT DOCUMENTS

| | | | | |
|---|---|---|---|---|
| 2009/0307176 A1* | 12/2009 | Jeong | .................... | G06F 16/337 706/52 |
| 2010/0174923 A1* | 7/2010 | Houlihan | .............. | G06F 1/3287 713/300 |
| 2011/0228668 A1* | 9/2011 | Pillai | .................... | G06F 11/2043 370/217 |
| 2013/0290979 A1 | 10/2013 | Kawano et al. | | |
| 2015/0120706 A1* | 4/2015 | Hoffman | .............. | G06N 3/0445 707/722 |
| 2017/0255468 A1* | 9/2017 | Bequet | ................ | G06F 9/30181 |
| 2017/0286507 A1 | 10/2017 | Hosogi et al. | | |
| 2018/0165331 A1* | 6/2018 | Zhang | ............... | G06F 16/24532 |

FOREIGN PATENT DOCUMENTS

| | | |
|---|---|---|
| WO | 2012/105056 A1 | 8/2012 |
| WO | 2017/013758 A1 | 1/2017 |

OTHER PUBLICATIONS

Japanese Office Action dated Apr. 28, 2020 for the Japanese Patent Application No. 2019-502321.

Core technology of "Oracle Fusion Middleware", UNIX magazine, Jul. 2007 (with English abstract).

Miura et al., "A Scheduling Method for Multiple Information Searching Taking into Account Usage Efficiency of Idle Computational Resources in Network," (2013). (with English abstract).

* cited by examiner

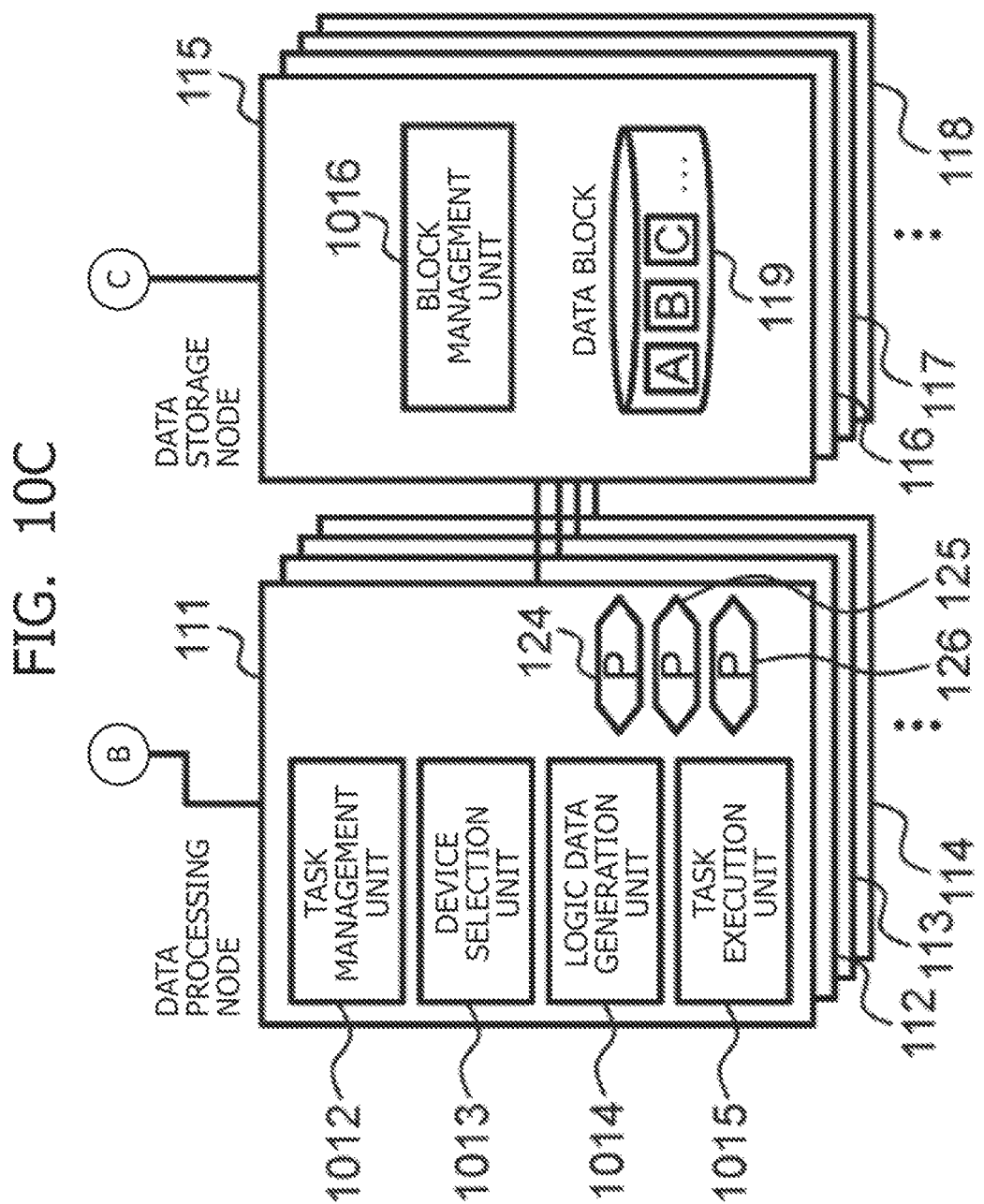

FIG. 13

EXECUTION TIME PER 100 GB

| [ms] | CPU/Core/GHz | /FPGA | /GPU |
|---|---|---|---|
| TASK 1.1 | 1000 | 1 | 10 |
| TASK 1.2 | 500 | 10 | NA |
| TASK 1.3 | 400 | NA | 8 |

FIG. 14

COMPUTING DEVICE CONFIGURATION OF EACH NODE

|  | CPU | FPGA | GPU |
|---|---|---|---|
| NODE 1 | 20c(4GHz) | 1 | 1 |
| NODE 2 | 20c(2GHz) | 0 | 2 |
| NODE 3 | 10c(2GHz) | 0 | 0 |

FIG. 15

TASK 1.1 EXECUTION TIME OF EACH NODE AND EACH COMPUTING DEVICE

| [ms] | CPU | FPGA | GPU |
|---|---|---|---|
| NODE 1 | 12.5 | 1 | 10 |
| NODE 2 | 25 | — | 5 |
| NODE 3 | 50 | — | — |

FIG. 16

EXECUTION TIME OF EACH NODE
(WHEN OPTIMUM COMPUTING DEVICE IS SELECTED)

| [ms] | TASK 1.1 | TASK 1.2 | TASK 1.3 |
|---|---|---|---|
| NODE 1 | 1(FPGA) | 6.25(CPU) | 5(CPU) |
| NODE 2 | 5(GPU) | 12.5(CPU) | 4(GPU) |
| NODE 3 | 50(CPU) | 25(CPU) | 20(CPU) |

FIG. 17

COMPUTING PERFORMANCE OF EACH NODE
(WHEN OPTIMUM COMPUTING DEVICE IS SELECTED)

| [TB/s] | TASK 1.1 | TASK 1.2 | TASK 1.3 | GEOMETRIC MEAN |
|---|---|---|---|---|
| NODE 1 | 10 (FPGA) | 1.6(CPU) | 2(CPU) | 3.2 |
| NODE 2 | 2(GPU) | 0.8(CPU) | 2.5(GPU) | 1.6 |
| NODE 3 | 0.2(CPU) | 0.4(CPU) | 0.5(CPU) | 0.3 |

FIG. 18

DATA DISTRIBUTION TO EACH NODE
(OPTIMUM AMOUNT OF EACH TASK, GEOMETRIC MEAN RATIO)

| [GB] | TASK 1.1 | TASK 1.2 | TASK 1.3 | GEOMETRIC MEAN |
|---|---|---|---|---|
| NODE 1 | 839 | 585 | 410 | 637 |
| NODE 2 | 168 | 293 | 512 | 318 |
| NODE 3 | 17 | 146 | 102 | 69 |

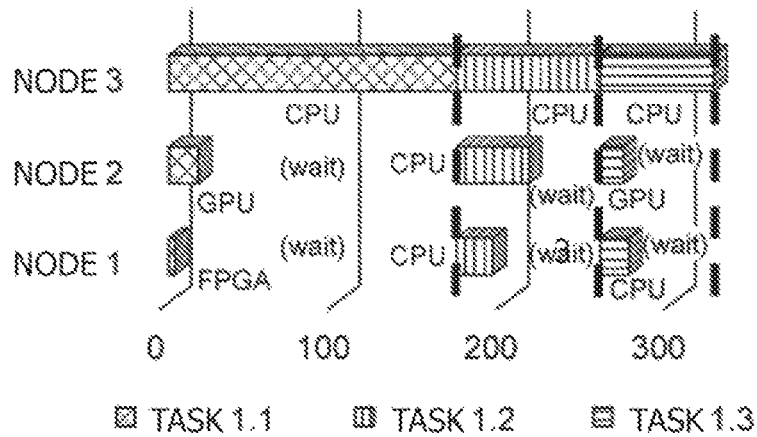
FIG. 19A  CASE WHERE DATA IS EVENLY DISTRIBUTED (PRIOR PART)
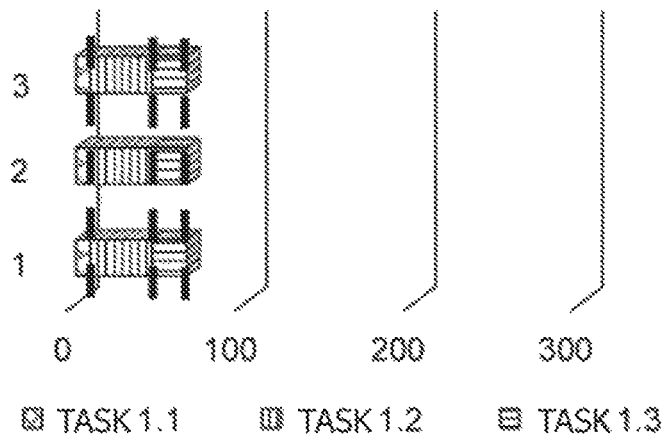
FIG. 19B  CASE WHERE DATA IS DISTRIBUTED BY OPTIMUM DATA AMOUNT OF EACH TASK
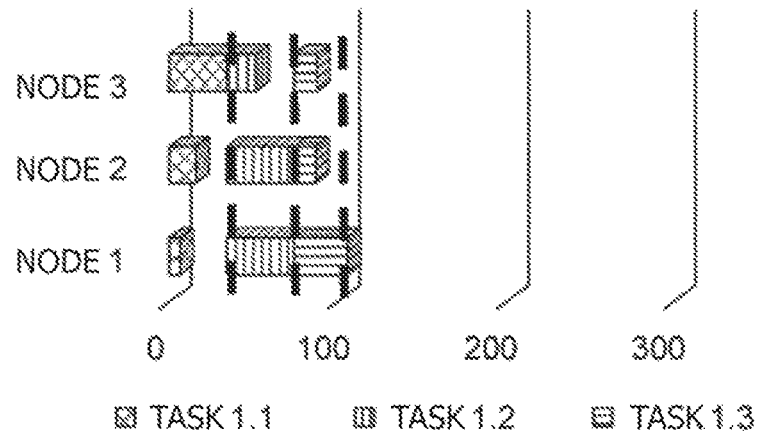
FIG. 19C  CASE WHERE DATA IS DISTRIBUTED BY MEAN OF OPTIMUM DATA AMOUNTS OF TASKS

US 10,936,377 B2

DISTRIBUTED DATABASE SYSTEM AND RESOURCE MANAGEMENT METHOD FOR DISTRIBUTED DATABASE SYSTEM

TECHNICAL FIELD

The present invention relates to a distributed database system and a resource management method for the distributed database system, and is suitably applied to a resource management method for data analysis processing using a distributed database system in particular.

BACKGROUND ART

In general, for interactive analysis for interpreting big data from various points of view, a distributed database system that includes a large number of data processing servers arranged in a distributed manner and executes data processing in parallel to increase the processing speed is suitable. As such a distributed database system, for example, Apache Hadoop (registered trademark) is used. In order to process a large amount of data at high speed, a large number of data processing servers (nodes) are generally required to achieve satisfactory computing performance, which results in an increase in system scale and increases in installation cost and maintenance cost.

In view of this, there is considered application of a technology for reducing a system scale by mounting, on a node, an accelerator using a field programmable gate array (FPGA), a general-purpose computing on graphics processing unit (GPGPU), or a dedicated application specific integrated circuit (ASIC) capable of performing high-speed data processing, to thereby improve the performance of the node to reduce the required number of nodes. When accelerators are applied, there are assumed not only a homogeneous configuration in which accelerators having the same performance are mounted on all nodes on a distributed system so that central processing units (CPUs) that the nodes themselves include have the same performance, but also a configuration in which the types of accelerators are different, accelerators are mounted only on some nodes, or CPU performance is different between nodes. In such a case, a system is heterogeneous, which may result in a variation in data processing performance between nodes.

Non-Patent Document 1 discloses a technology for allocating, in a distributed processing system having heterogeneity in node performance, node groups having different performance to the respective types of tasks that are units of processing of breaking down a job into tasks to execute the tasks in a distributed manner, depending on the CPU utilization of nodes.

WO 2012/105056 (Patent Document 1) discloses a technology for adjusting, when a parallel distributed system is added to servers that an existing system uses to coexist with the existing system, the processing of each node of the parallel distributed system. When a priority is put on the processing that is executed in the existing system, the computing resources and the I/O resources of nodes that the distributed system can use are changed on the basis of the execution status of the processing in question. At this time, the load and resource use amounts of the nodes are observed, and data blocks are transferred to a node having a margin of a node load or a node resource from another node depending on the processing progress of the data blocks that the nodes hold.

JP-2014-215764-A (Patent Document 2) discloses a method for levelling the processing times of nodes by determining the maximum data amount that each task to be executed by the node processes, on the basis of the relationship between the number of tasks of each node and the number of nodes with respect to an input data amount.

PRIOR ART DOCUMENT

Patent Documents

Patent Document 1: WO 2012/105056
Patent Document 2: JP-2014-215764-A

Non-Patent Document

Non-Patent Document 1: S. F. El-Zoghdy and Ahmed Ghoneim, "A Multi-Class Task Scheduling Strategy for Heterogeneous Distributed Computing Systems," KSII Transactions on Internet and Information Systems, vol. 10, no. 1, pp. 117-135, 2016.

SUMMARY OF THE INVENTION

Problems to be Solved by the Invention

In Non-Patent Document 1 described above, the plurality of different tasks are distributed to the nodes so that all the nodes have the same CPU utilization, for example, but this is not applied to a system in which the same task is distributed to a plurality of nodes, such as Hadoop (registered trademark) processing.

In Patent Document 1, the data are transferred to the node having the margin during processing execution depending on the processing status of each node so that the processing times of the nodes are levelled, but this does not consider the non-uniformity of task execution performance based on the computing resources of the nodes.

In Patent Document 2, the input data are evenly divided on the basis of the total number of tasks to be processed in the distributed system, thereby being allocated to each node, but the tasks have the same data amount, and hence Patent Document 2 does not consider a variation in computing performance between the nodes.

The present invention has been made in view of the above-mentioned points, and is intended to propose a distributed database system capable of shortening data processing time as a whole system and a resource management method for the distributed database system.

Means for Solving the Problems

In order to solve the above-mentioned problems, according to the present invention, there is provided a distributed database system including: one or more data processing nodes each including one or more computing devices configured to process data; a computing power determination unit configured to determine a difference in computing power between the one or more computing devices of the one or more data processing nodes; a device selection unit configured to select a plurality of optimal computing devices based on the difference in computing power between the one or more computing devices; and a task distribution control unit configured to distribute, when a task is executed using the plurality of optimal computing devices, a data amount of the data to be processed with a processing command of the task for the plurality of optimal computing devices depending on a difference in computing power between the plurality of optimal computing devices, to thereby allow the task to be executed in a distributed manner using the plurality of optimal computing devices.

Further, according to the present invention, there is provided a resource management method for a distributed database system including one or more data processing nodes each including one or more computing devices configured to process data and a control unit, the resource management method including: a computing power determination step of determining, by the control unit, a difference in computing power between the one or more computing devices of the one or more data processing nodes; a device selection step of selecting, by the control unit, a plurality of optimal computing devices based on the difference in computing power between the one or more computing devices; and a task distribution control step of distributing, by the control unit, when a task is executed using the plurality of optimal computing devices, a data amount of the data to be processed with a processing command of the task for the plurality of optimal computing devices depending on a difference in computing power between the plurality of optimal computing devices, to thereby allow the task to be executed in a distributed manner using the plurality of optimal computing devices.

Effect of the Invention

According to the present invention, the data processing time of the whole system can be shortened.

BRIEF DESCRIPTION OF THE DRAWINGS

FIGS. 10A to 10C are diagrams specifically illustrating a function of adjusting the amount of data to be allocated to a data storage node, depending on the data processing performance of the data processing node.

FIG. 13 illustrates examples of execution times based on the processing load of each task determined by a task load determination unit.

FIG. 14 illustrates configuration examples of computing devices mounted on data processing nodes.

FIG. 15 illustrates results obtained by a task execution performance computing unit computing the task execution time of each computing device.

FIG. 16 is an example illustrating task execution times when optimal computing devices are selected for each task in each node.

FIG. 17 is a diagram illustrating the comparison of the execution times in FIG. 16 with data processing performance (TB/s).

FIG. 18 is a diagram illustrating data distribution amounts when the execution times of the nodes are levelled with the use of the resource management method according to the present embodiment.

FIGS. 19A to 19C are diagrams illustrating effects obtained by adjusting the data distribution depending on the computing performance of the data processing nodes with the use of the resource management method according to the present embodiment.

MODE FOR CARRYING OUT THE INVENTION

Now, one embodiment of the present invention is described in detail with reference to the drawings.

Figure 1:
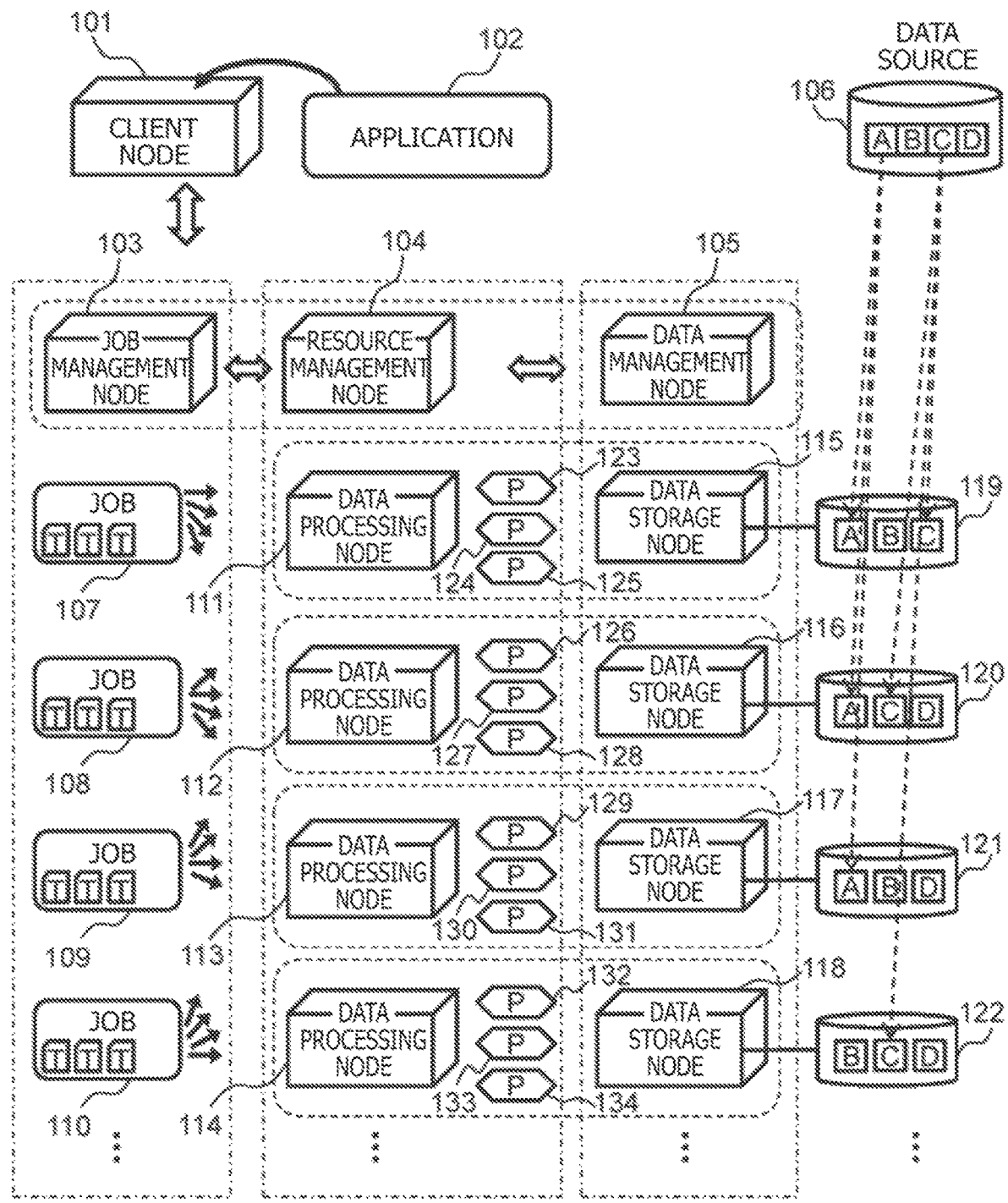
FIG. 1 is a diagram illustrating a configuration example of a distributed database system according to the present embodiment.

(1) System Configuration According to Present Embodiment (1-1) Overall Configuration FIG. 1 is a block diagram illustrating a configuration example of a distributed database system according to the present embodiment. The distributed database system includes a client node 101, a job management node 103, a resource management node 104, a data management node 105, data processing nodes 111 to 114, and data storage nodes 115 to 118.

These components including the node 101 are connected to each other via a network (not shown), such as Ethernet (registered trademark), and transmission and reception of control signals and data are performed via the network.

The network may be a closed local domain network (local area network: LAN). Some or entire parts of each node may be allocated to different domains of data centers, for example, and the nodes may be connected to each other via a global network (wide area network: WAN). The data processing nodes 111 to 114 and the data storage nodes 115 to 118 may be connected to each other via a so-called storage area network (SAN).

(1-2) Client Node

The client node 101 is a computer at least including a processor, a memory, and a network interface. The client node 101 may further include a storage device and a user interface for operating the computer.

In the client node 101, an application program (corresponding to "application" in FIG. 1) 102 is transmitted via the network (not shown), stored in the storage device (not shown), or installed via the user interface. The application program 102 is loaded on the memory (not shown) to be executed by the processor (not shown).

The application program 102 has, in its source code, a command for executing data processing with the use of the distributed database system. When the application program 102 is executed, the command for executing data processing is called, and the data processing is executed in the distributed database system on the basis of the command.

(1-3) Job Management Node

The job management node 103 is a computer at least including a processor, a memory, and a network interface. The job management node 103 may further include a storage device and a user interface for operating the computer, which are not illustrated.

The job management node 103 receives the data processing command that the application program 102 on the client node 101 has issued, and configures jobs 107 to 110 for executing the data processing on the distributed database system.

In addition, the job management node 103 generates tasks each of which is a unit at which the data processing in the job is allocated to a plurality of data processing nodes in a distributed manner to be executed. For example, in a Hadoop (registered trademark) distributed processing system, a unit at which data processing is executed by a combination of Map processing and Reduce processing corresponds to the "job." The Map processing and the Reduce processing each correspond to the "task."

The task is executed by the plurality of data processing nodes 111 to 114 in a distributed manner. The job management node 103 requests the resource management node 104 to use the data processing nodes 111 to 114 that execute the generated task.

(1-4) Resource Management Node

The resource management node 104 is a computer at least including a processor, a memory, and a network interface. The resource management node 104 may further include a storage device and a user interface for operating the computer, which are not illustrated.

The resource management node 104 receives, from the job management node 103, the request that requests the resource management node 104 to use the data processing nodes 111 to 114 that execute the task, and selects usable nodes of the data processing nodes 111 to 114 on the basis of resource management information. Then, the resource management node 104 allocates the task to the selected data processing nodes 111 to 114 so that the data processing nodes 111 to 114 execute the task. In addition, the resource management node 104 schedules the execution order and the execution ratio of one or more jobs configured by the job management node, on the basis of priority and various conditions, to thereby execute the jobs.

(1-5) Data Management Node

The data management node 105 is a computer at least including a processor, a memory, and a network interface. The data management node 105 may further include a storage device and a user interface for operating the computer, which are not illustrated.

The data management node 105 acquires data to be processed in the distributed database system from a data source 106, and divides the data into blocks each having a specified division size to store the blocks in the data storage nodes 115 to 118. At this time, in order to ensure the availability and the reliability of the data, the data management node 105 may create one or more replicas of each block and allocate the replicas in question to a plurality of nodes in a distributed manner so that the data are not lost when a specific node stops, for example.

In the distributed database system according to the present embodiment, all or two nodes of the job management node 103, the resource management node 104, and the data management node 105 can be configured on the physically same computer. In addition, the client node 101 can be configured on the physically same computer together with one or all of the nodes.

(1-6) Data Processing Node

The data processing nodes 111 to 114 execute the tasks set by the resource management node 104 with the use of specific computing devices or memories, for example. At this time, the data processing nodes 111 to 114 are connected to partitions 123 to 134 that are logical data units set in advance to perform the data processing for each task.

(1-7) Data Storage Node

The data storage nodes 115 to 118 store the data blocks specified to be allocated by the data management node 105 in storage devices 119 to 122 that the data storage nodes 115 to 118 include. The storage devices 119 to 122 are hard disks or flash memory devices, for example. In the present embodiment, the data blocks may be stored in a main memory such as a so-called DRAM instead of the storage devices that are the storage devices 119 to 122.

One or more data blocks stored in each of the data storage nodes 115 to 118 are allocated to each of the partitions 123 to 134 set in the data processing nodes 111 to 114. The data blocks that are allocated to the partitions set in each data processing node are not limited to the ones mounted on the data storage node pairing to the data processing node in question. The data blocks mounted on another data storage node may be allocated to the partitions set in the data processing node and refered via the network.

The tasks of the data processing nodes 111 to 114 access the allocated data blocks via the partitions 123 to 134, which are logical data.

The system configuration illustrated in FIG. 1 is an example of the configuration of the distributed database system according to the present embodiment, and as another configuration example, one node may serve as the data processing node and the data storage node, for example. When a task on the data processing node and data that the task processes are present on the same physical node, data transfer speed is not limited by network bandwidth performance between the nodes, and hence the task may access the data at a higher speed.

Further, in each data processing node, a node management program (not shown) for managing the resource of the node is executed. The data processing nodes may, however, be managed by nodes for executing these node management programs, the nodes being prepared separately from the data processing nodes and connected to the data processing nodes via the network. In this case, the job execution performance of the data processing nodes is not affected by the loads of the node management programs.

Next, processing time taken by the distributed database system to execute the tasks in parallel is described on the basis of some conditions.

(1-8) Configuration Example of Data Processing Node as Comparative Example

Figure 2:
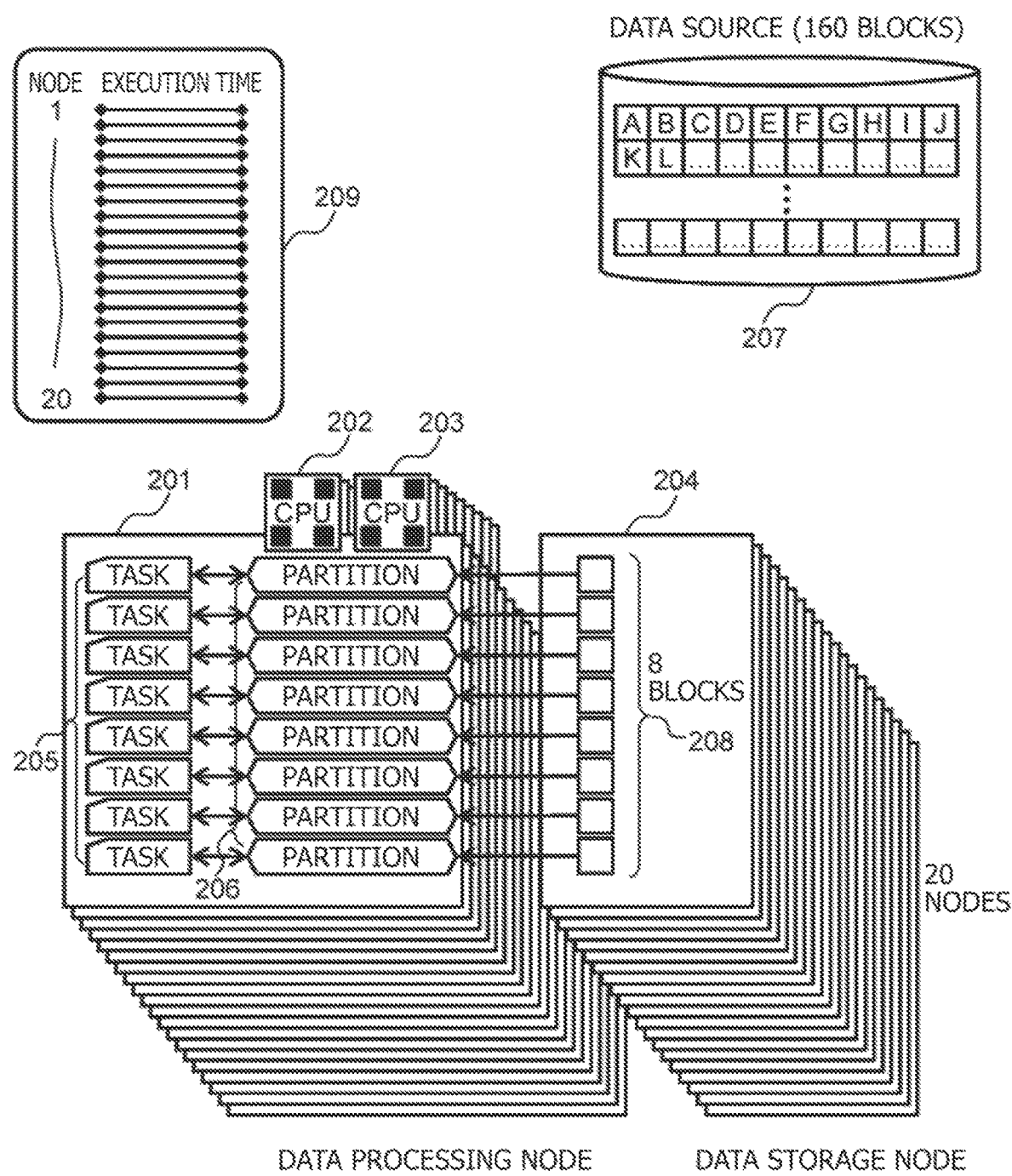
FIG. 2 is a diagram illustrating a configuration example in which a data source is processed by 20 data processing nodes.

FIG. 2 is a diagram illustrating an example of the configuration of the data processing node illustrated in FIG. 1. The configuration in FIG. 2 exemplifies a computer on which two quad-core CPUs (202 and 203) are mounted as a data processing node 201.

Task execution by the data processing node 201 can be multiplexed by the number of CPU cores. FIG. 2 illustrates a case where the number of CPU cores per node is eight and eight tasks are thus executed at the same time.

In this example, partitions 206 are associated with eight tasks 205 on a one-on-one basis. Data blocks are allocated to the respective partitions on a one-on-one basis, and hence eight data blocks 208 stored in a data storage node 204 are allocated to the respective partitions on a one-on-one basis.

A data source 207 to be processed in the distributed database system according to the present embodiment is divided into 160 blocks on the basis of a block size set in advance.

When the 160 data blocks are evenly distributed to all the data processing nodes, 20 pairs of the data processing nodes and the data storage nodes are required to process all the data blocks.

In the example in FIG. 2, however, the replicas of the data blocks are omitted. Time taken by one task to process the data of one data block using one CPU core via one partition is defined as "one unit of time." Then, time taken by the 20 eight-core data processing nodes to process the 160 data blocks is the same between all the data processing nodes and is one unit of time as indicated by a graph 209. The numerical values in this example, such as the number of CPUs, the number of nodes, the number of tasks, and the number of partitions, are examples set for description. Needless to say, these numerical values are not necessarily required for implementation of the present invention. In the present embodiment, the illustration of overhead time for processing other than the data processing, such as task execution control, is omitted on the assumption that such overhead time is sufficiently shorter than data processing time.

Figure 3:
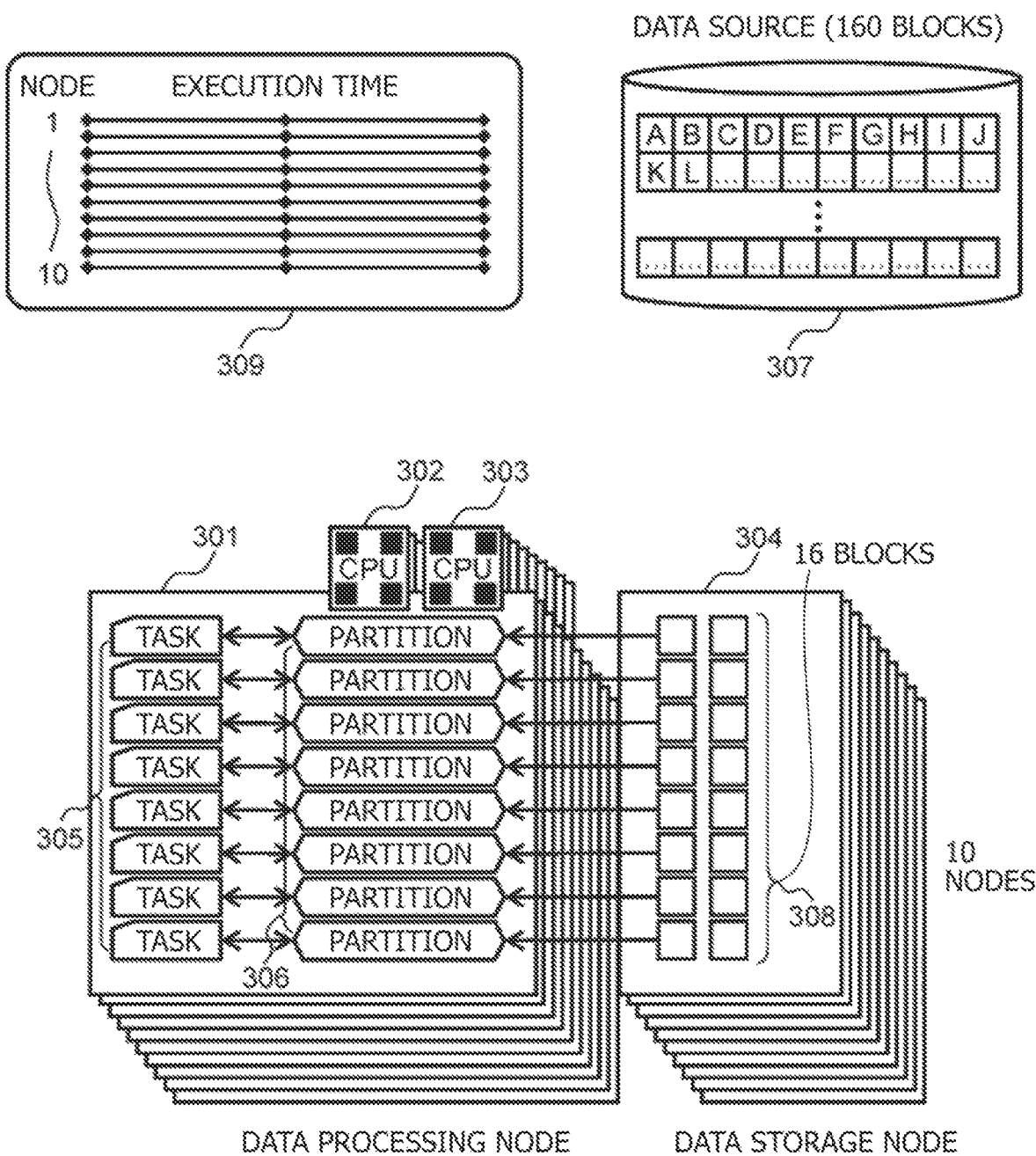
FIG. 3 is a diagram illustrating a configuration example in which a data source is processed by 10 data processing nodes.

FIG. 3 illustrates a case where the data of a data source like the one in FIG. 2 are processed by 10 data processing nodes under the same conditions. A data processing node 301 in FIG. 3 includes two quad-core CPUs (302 and 303) and can process eight tasks at the same time.

In the example in FIG. 3, partitions 306 are associated with eight tasks 305 on a one-on-one basis as in FIG. 2. The number of the data processing nodes 301 is 10, which is half the number of the data processing nodes in the example in FIG. 2, and hence 16 blocks of 160 data blocks are allocated to each data storage node.

When two data blocks are allocated to each partition to process the 16 blocks by the eight tasks, time taken by one task to process the two data blocks is two units of time as indicated by a graph 309, which means that time twice as long as the time in the case of using the 20 data processing nodes is required.

Figure 4:
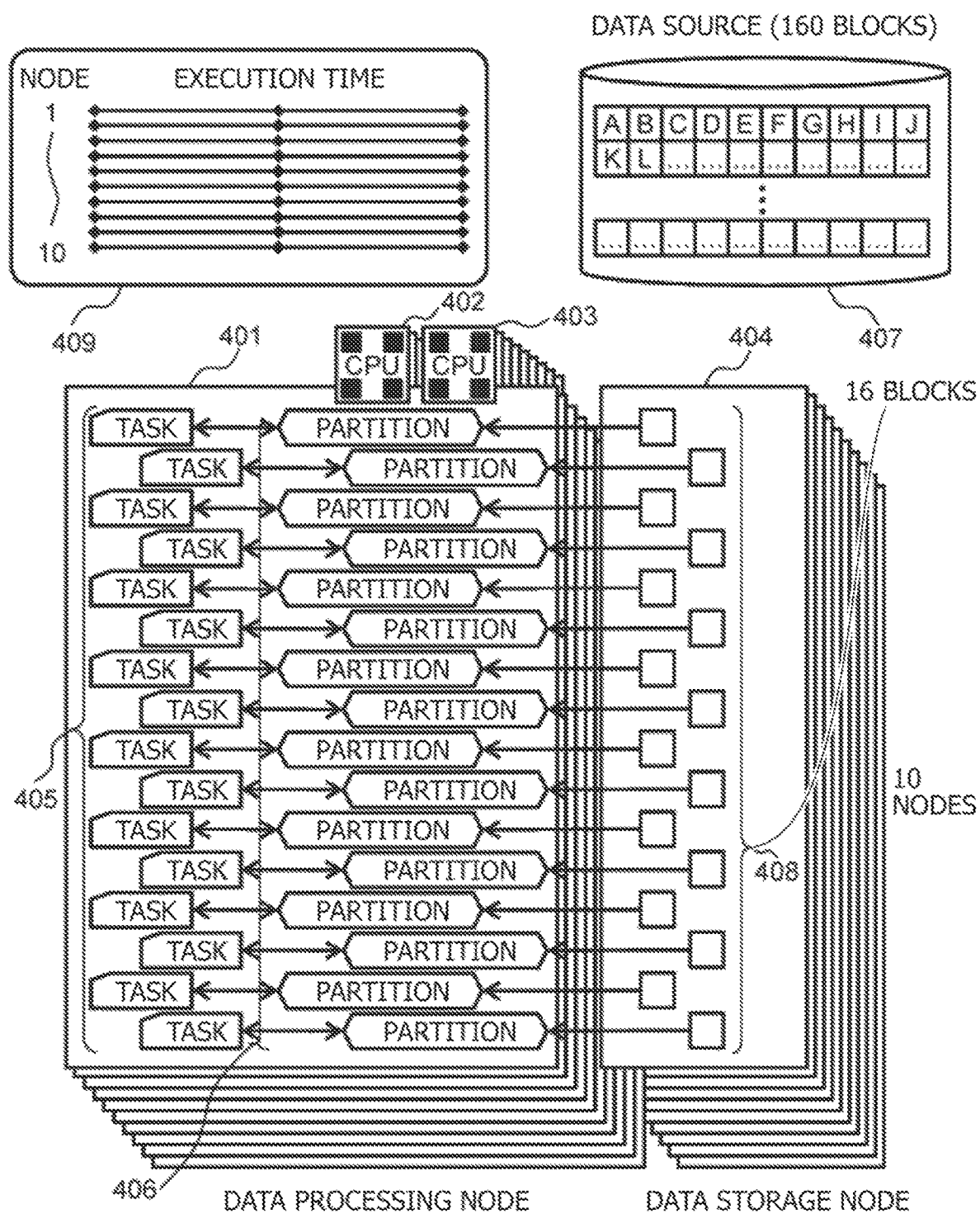
FIG. 4 is a diagram illustrating another configuration example in which a data source is processed by 10 data processing nodes.

FIG. 4 is another configuration example in which 160 data blocks 404 are processed by 10 data processing nodes 401 as in FIG. 3. In FIG. 4, 16 tasks 405 are executed with eight cores.

When the tasks are associated with partitions 406 on a one-on-one basis and one data block is allocated to each partition, it is necessary to execute two tasks per CPU core, and hence the data processing time is two units of time, which is the same as that in FIG. 3.

Figure 5:
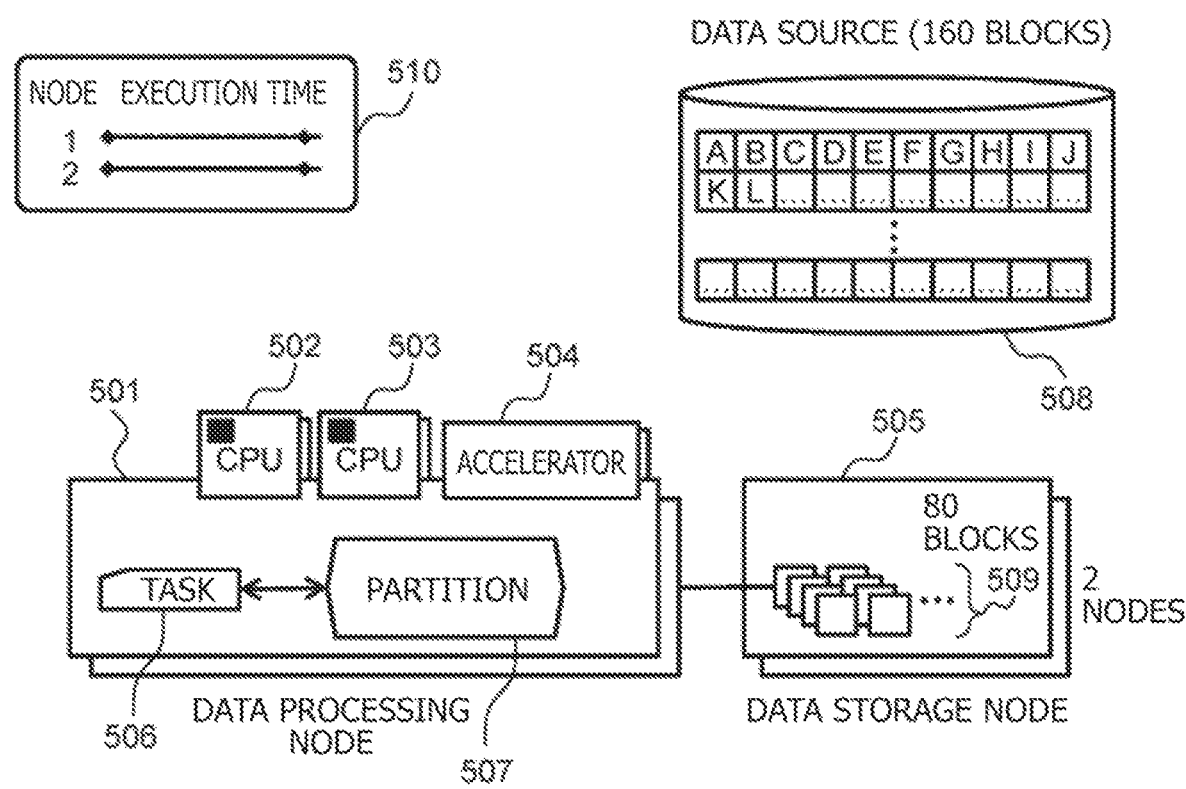
FIG. 5 is a diagram illustrating a configuration example in which a data source is processed by two accelerator-mounted data processing nodes.

FIG. 5 is a configuration example in which, as the computing devices of a data processing node 501, an accelerator 504 configured to increase the execution speed of the data processing, such as an FPGA or a GPU, is provided in addition to CPUs 502 and 503.

For example, when it is assumed that the mounted accelerator 504 has performance 88 times as high as that of one CPU core, one accelerator can process 88 data blocks in one unit of time. In this case, the two accelerator-mounted data processing nodes 501 and data storage nodes 505 are prepared, and one task 506 that the accelerator executes is allocated to each data processing node while 80 data blocks 509 are allocated to a corresponding partition 507. Then, time required for processing of a data source 508 of 160 blocks is 10/11 units of time (data block 509), and hence the number of data processing nodes can be reduced, leading to a reduction in system scale.

At this time, it is not necessary to use the CPUs in the task execution, and hence a low-priced CPU including the small number of cores may be mounted to cut the cost or the CPU may be controlled to perform another processing so that the load of the whole system can be distributed. It is apparent that in order to complete the data processing in one unit of time as in the case where the 20 data processing nodes on which only the eight-core CPUs are mounted are used, it is only necessary for the accelerator to have performance 80 times as high as that of the CPU core.

Figure 6:
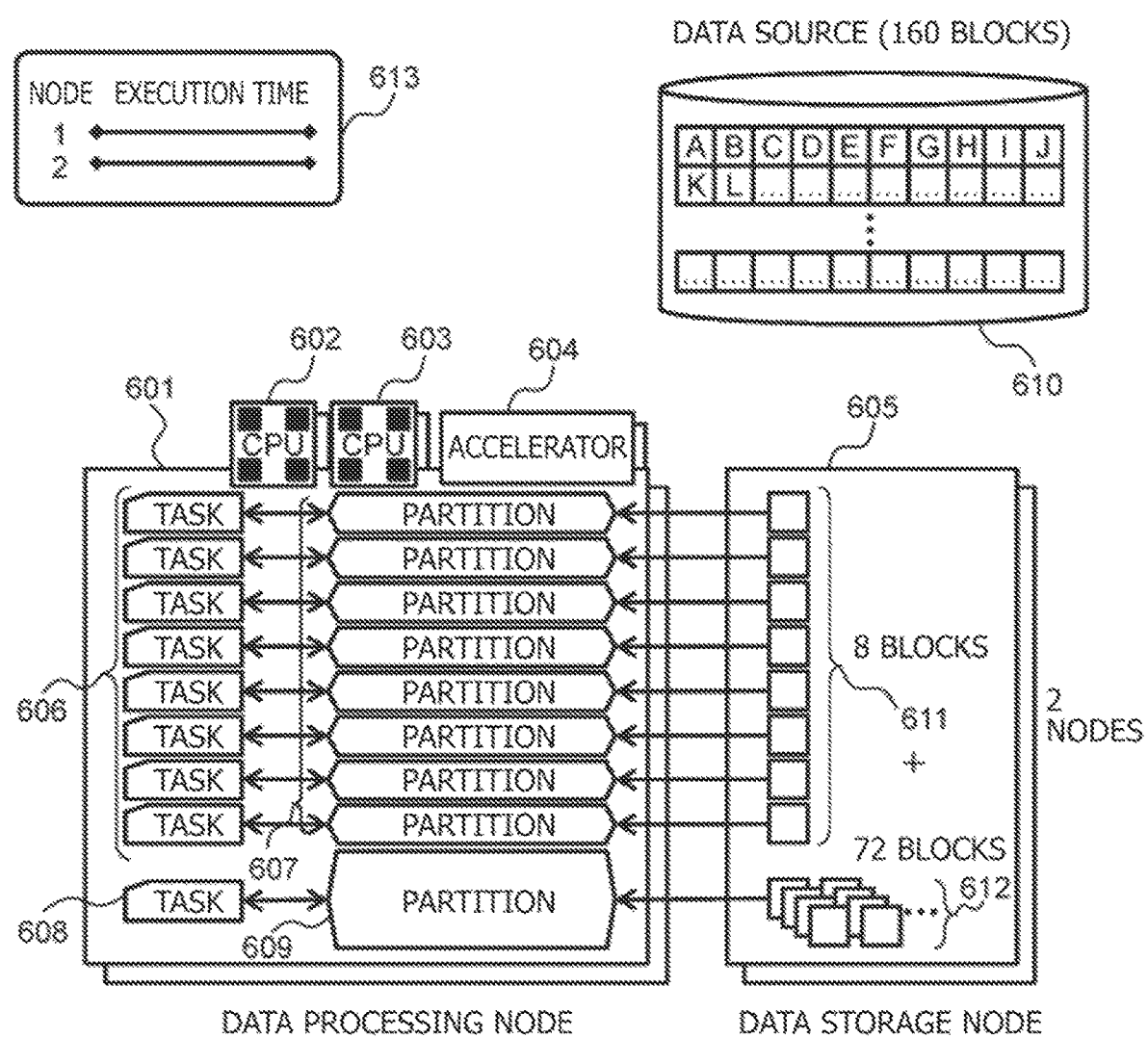
FIG. 6 is a diagram illustrating another configuration example in which a data source is processed by two accelerator-mounted data processing nodes.

FIG. 6 is another configuration example in which, similar to the example in FIG. 5, tasks are executed with the use of a data processing node 601 on which an accelerator 604 having data processing performance 88 times as high as that of one CPU core is mounted. In FIG. 6, the eight cores of each of CPUs 602 and 603 each execute one task 606 while the accelerator 604 executes one task 608 in parallel. Partitions 607 and 609 are associated with the respective tasks on a one-on-one basis.

Data blocks 611 of a data storage node 605 are allocated to the respective eight partitions 607 on a one-on-one basis, and 72 data blocks 612 are associated with the partition 609. With two pairs of the data processing node and the data storage node, each of which has this configuration, a data source 610 of 160 blocks can be processed in one unit of time. At this time, it is only necessary for the accelerator to have performance 72 times as high as that of the CPU core.

Figure 7:
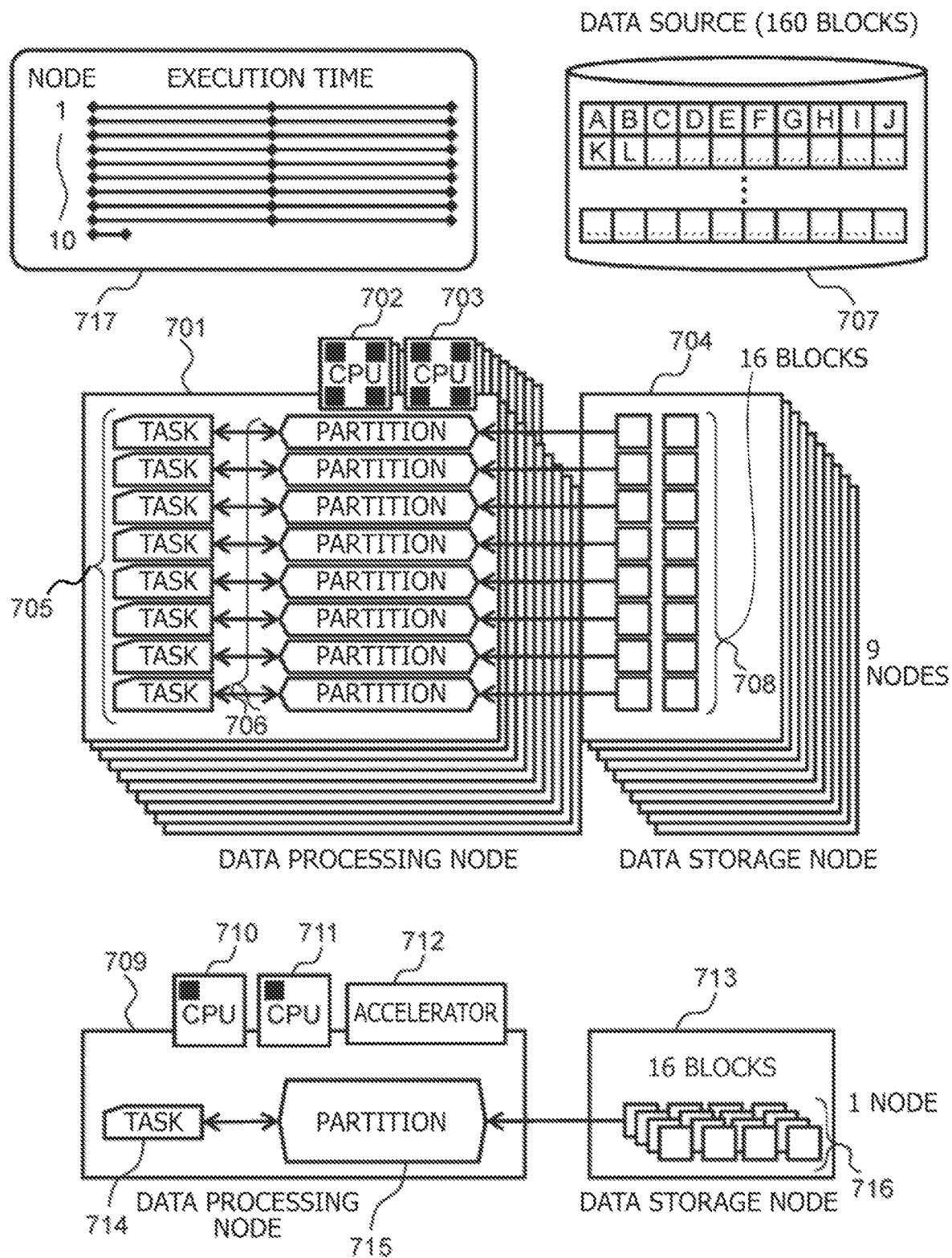
FIG. 7 is a diagram illustrating a configuration example in which a data source is processed by nine without-accelerator data processing nodes and one accelerator-mounted data processing node.

FIG. 7 is a configuration example in which a data source 707 of 160 data blocks is processed as in FIG. 2 to FIG. 6, and only one data processing node 709 on which an accelerator is mounted is used.

Similar to the examples described so far, when the data blocks are evenly allocated to data storage nodes and 10 data processing nodes execute tasks as in FIG. 3, 16 data blocks are allocated to each data storage node.

At this time, in nine data processing nodes 701 on which only eight-core CPUs are mounted, two of data blocks 708 stored in the data storage nodes are allocated to each of eight partitions 706 associated with eight tasks 705, and hence the data processing node 701 requires two units of time to process the task.

In the data processing node 709 on which an accelerator 712 having data processing performance 88 times as high as that of the CPU core is mounted, on the other hand, 16 data blocks in a data storage node 713 pairing to the data processing node 709 are processed by one task 714 and one partition 715, and hence the task execution is complete in 2/11 units of time.

However, in a case where execution of one task in a distributed manner is complete and next task is then executed, such as the Map/Reduce processing of Hadoop, execution of next job processing waits until task execution in a data processing node on which only a CPU is mounted is complete. As a result, two units of time are required for the completion of task execution as a whole system, which means that the effect of an accelerator cannot be utilized.

(1-9) Configuration of Data Processing Node According to Present Embodiment

Figure 8:
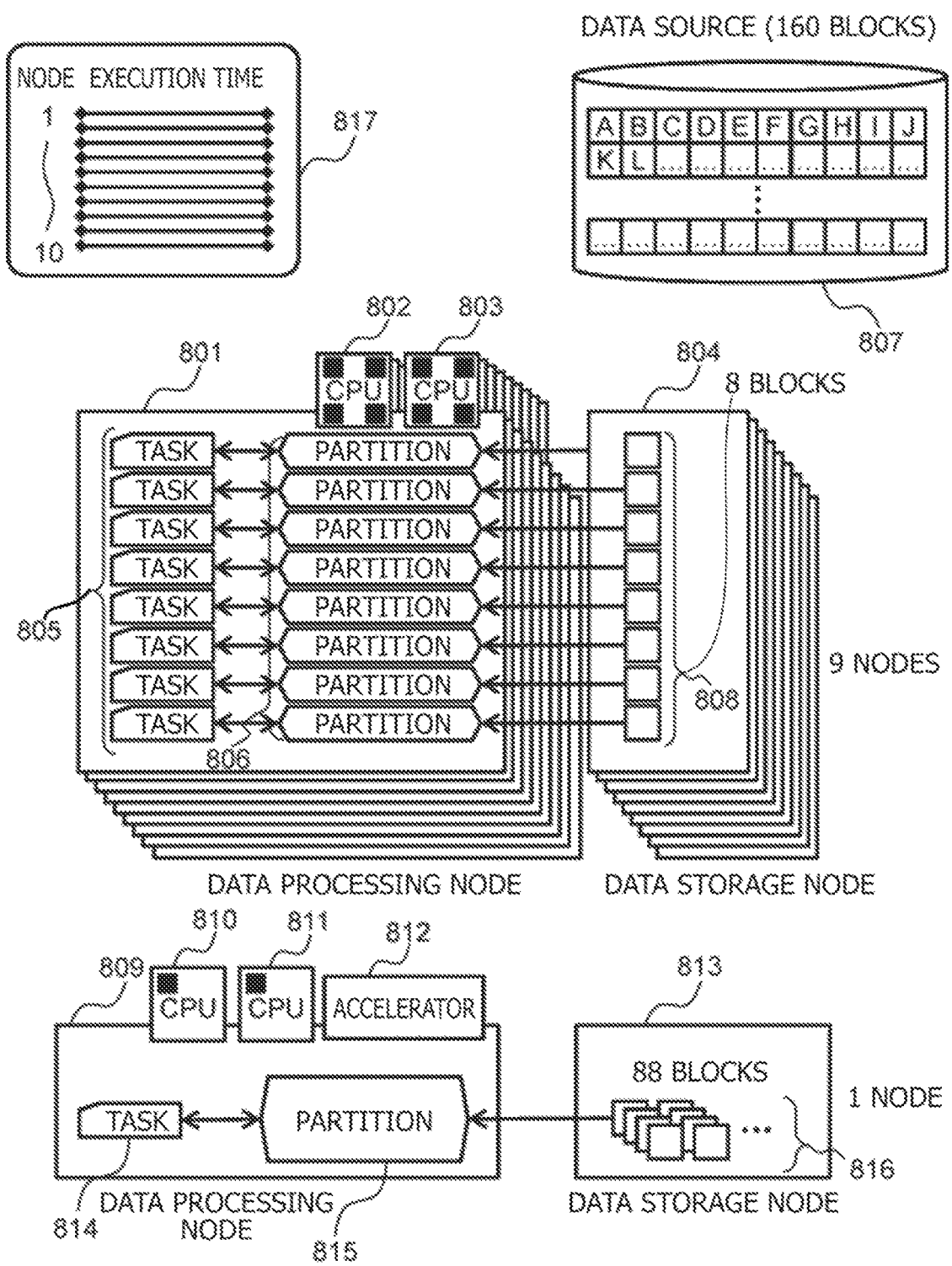
FIG. 8 is a diagram illustrating a configuration example using a resource management method according to the present embodiment in a case where a data source is processed by nine without-accelerator data processing nodes and one accelerator-mounted data processing node.

In view of this, in the present embodiment, a configuration as illustrated in FIG. 8 is employed. Specifically, in FIG. 8, as data that a data processing node 801 on which only CPUs 802 and 803 are mounted processes, eight data blocks 808 are stored in a data storage node 804. In addition, in FIG. 8, eight CPU cores each execute one task, and the data blocks 808 are allocated, on a one-on-one basis, to eight partitions 806 associated with the respective tasks on a one-on-one basis.

In this way, the task execution time of the data processing node 801 and the eight other data processing nodes each having the same configuration as the data processing node 801 has, and the corresponding nine data storage nodes is one unit of time.

In a data processing node 809 on which an accelerator 812 having performance 88 times as high as that of one CPU core is mounted, on the other hand, the accelerator executes one task 814 with one partition 815 associated with the task and 88 blocks allocated to the partition. Then, also in the data processing node 809, execution of the task that processes the data of 88 blocks is complete in one unit of time.

In this way, the amount of data to be processed is adjusted on the basis of the computing performance of the data processing nodes, and hence the distributed database system according to the present embodiment can optimize the task execution time of the whole system (see graph 817).

Figure 9:
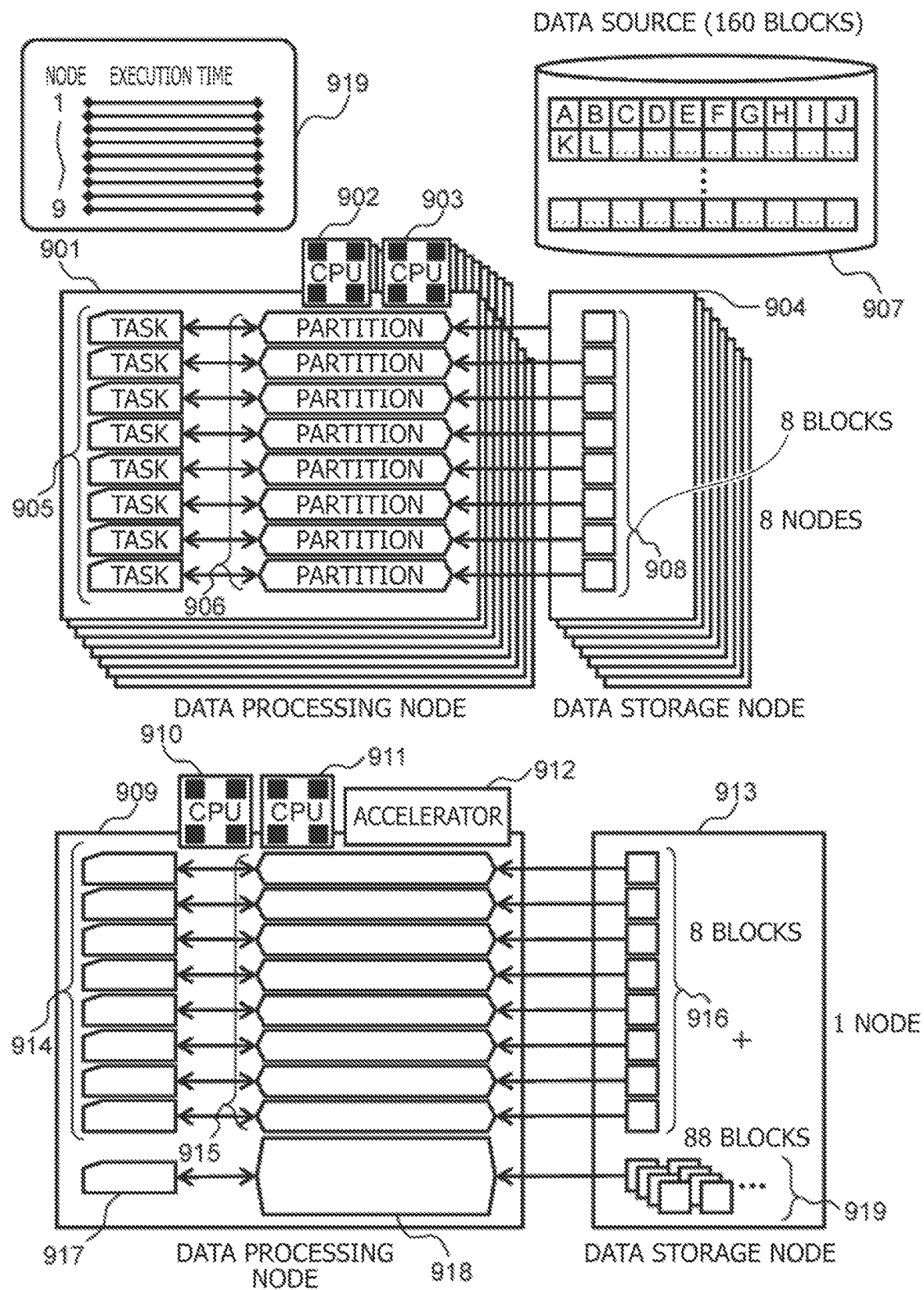
FIG. 9 is a diagram illustrating another configuration example using the resource management method according to the present embodiment in a case where a data source is processed by nine without-accelerator data processing nodes and one accelerator-mounted data processing node.

FIG. 9 is a diagram illustrating an example of a resource management method according to the present embodiment. Specifically, FIG. 9 illustrates a configuration example in which tasks that process a data source 907 of 160 blocks are executed with the use of eight data processing nodes each having the same configuration as a data processing node 901 only including all-eight-core CPUs 902 and 903 as the computing devices, and a data processing node 909 having mounted thereon an accelerator 912 having performance 88 times as high as that of one CPU core in addition to CPUs 910 and 911 having eight cores like the CPUs 902 and 903.

In FIG. 9, the data processing node 901 and the seven other data processing nodes each having the same configuration as a data processing node 901 has execute the task in one unit of time, similar to the data processing node 801 illustrated in FIG. 8. With this, in the data processing node 909, the CPU cores 910 and 911 execute eight tasks 914 in one unit of time with partitions 915 corresponding to the tasks 914 and data blocks 916 in a data storage node 913, the data blocks 916 being associated with the respective partitions 915 on a one-on-one basis. Further, the accelerator 912 executes a task 917 with a partition 918 corresponding to the task 917 and 88 data blocks allocated to the partition 918 in one unit of time.

With this, all the nine data processing nodes and data storage nodes pairing to the data processing nodes can execute the tasks that process the data source 907 in one unit of time (see graph 919).

In the allocation of the data blocks to the data storage nodes, the number of data blocks to be allocated may be determined on the basis of the computing performance of the data processing nodes and the data blocks may be allocated in advance, or the data management node may be requested of the data blocks to be allocated to the data storage nodes in the task execution.

When required data blocks do not present on the data storage node connected to the data processing node via a high-speed network or the data storage node configured as the same computer as the data processing node, however, it is necessary to transfer data from another data storage node or directly refer to the data from another data storage node.

In this case, the rates of the data transfer via the network between the data storage nodes and the data reference of the data processing node to the data storage node via the network may be limited by the bandwidth of the network. Thus, when the data transfer or the data reference via the network is required to be performed during task execution, it is necessary to transfer data at a speed following the data processing by the node in order to fully utilize the processing performance of the computing device.

To achieve this, the following is conceivable: the nodes are connected to each other via a sufficiently-high speed network; a plurality of data storage nodes are mounted as a centralized storage so that data blocks are shared by the data storage nodes, and the data processing node and the centralized storage are connected to each other via a high-speed SAN; or the speed of data transfer between the data storage nodes is increased with the use of an internal communication bus, for example.

In the present embodiment, the following implementation method is described by taking as an example a case where, to the data storage node that is connected to the data processing node via the high-speed network or is configured as the same computer as the data processing node, the data blocks to be used in the task execution are allocated in advance before the task execution.

Figure 10A:
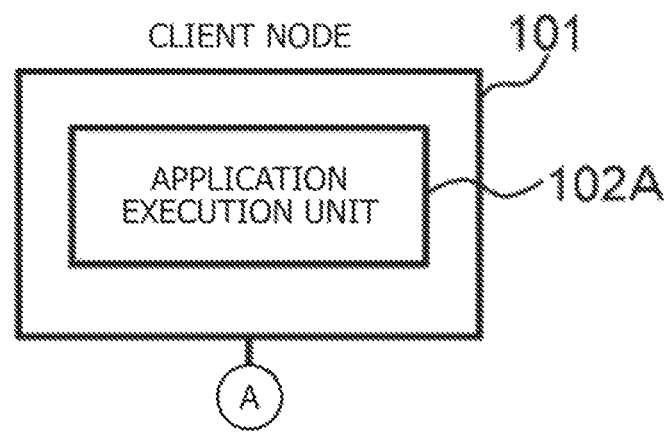
Figure 10B:
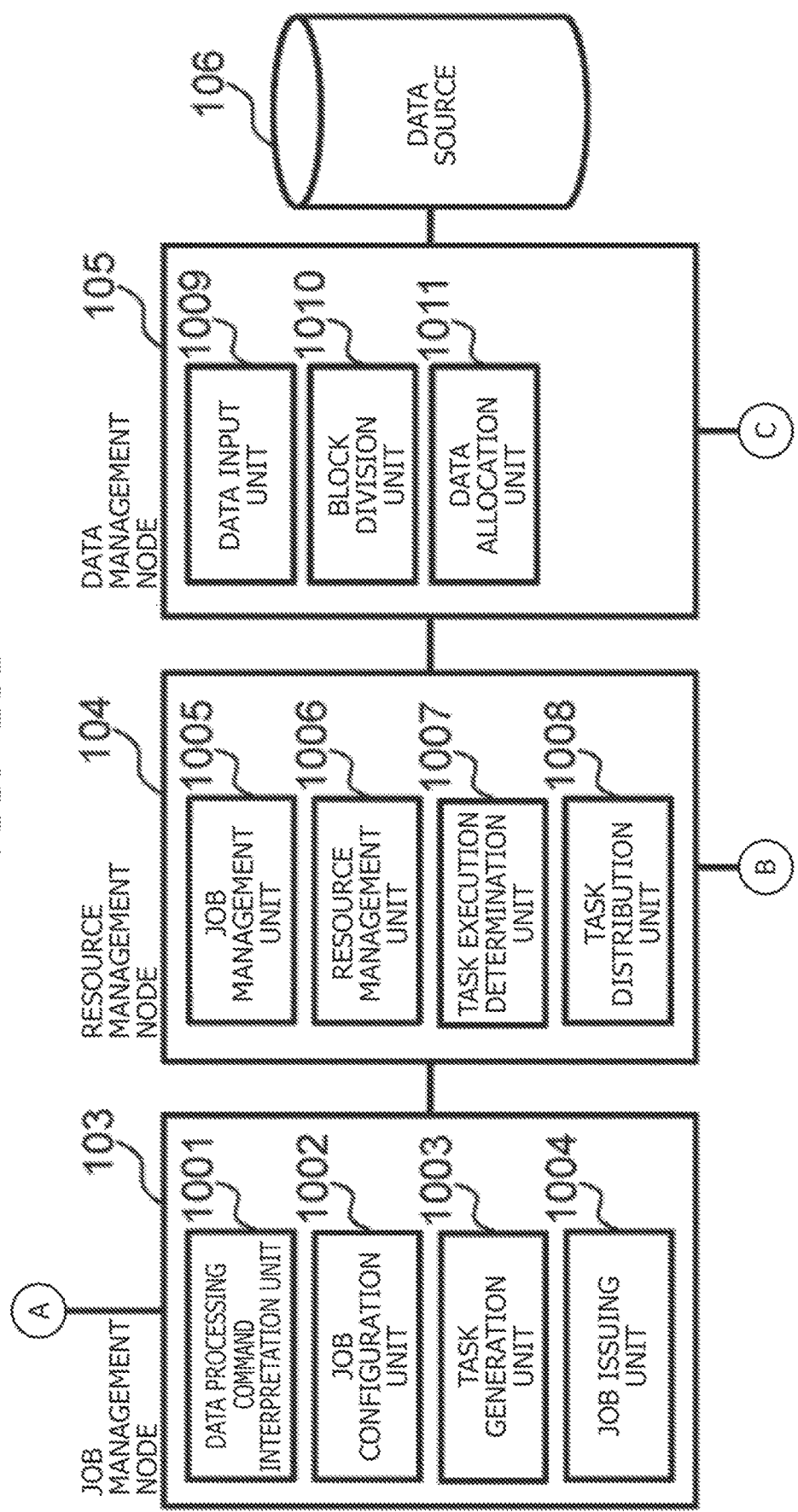

FIGS. 10A to 10C are diagrams specifically illustrating a function of adjusting the amount of data to be allocated to the data storage nodes 115 to 118, depending on the data processing performance of the data processing node 111 in the distributed database system illustrated in FIG. 1.

In FIGS. 10A to 10C, similar to the description on FIG. 1, although not illustrated, the nodes are connected to each other via the network. When the application execution unit 102A is executed in the client node 101, a data processing command is issued to the distributed database system.

In the job management node 103, a data processing command interpretation unit 1001 interprets the data processing command issued by the application execution unit 102A, and a job configuration unit 1002 configures a job executable in the distributed database system.

A task generation unit 1003 generates, in association with the thus configured job, a task that is a unit of a data processing program that is allocated to one of the one or more data processing nodes 111 to 114 in a distributed manner to be executed.

A job issuing unit 1004 requests the resource management node 104 of a required resource of the data processing nodes 111 to 114 managed by the resource management node 104, and issues a job and a task that is the component of the job to a specific data processing node allocated depending on the request in question.

In the resource management node 104, a job management unit 1005 schedules the one or more issued jobs on the basis of conditions such as priority, issued orders and/or computing resource occupancy, and executes the job in the allocated specific data processing node.

A resource management unit 1006 manages resource elements on the data processing nodes 111 to 114 included in the distributed database system, such as computing devices and memories.

A task execution determination unit 1007 interprets, for example, the load and the performance requirements of the task generated by the task generation unit 1003, and computes the task execution performance of each resource such as the computing devices of the data processing nodes 111 to 114.

A task distribution unit 1008 distributes the task to each of the data processing nodes 111 to 114 on the basis of the task execution performance determined by the task execution determination unit 1007.

The data management node 105 allocates a target data source that the application execution unit 102A processes to the distributed database system in a distributed manner.

A data input unit 1009 retrieves the data from the data source, and converts the data into a format suitable for the distributed processing as needed. A block division unit 1010 divides the data of the data source into blocks having sizes set in advance.

A data allocation unit 1011 stores the data blocks in the storage device 119 of the data storage nodes 115 to 118 pairing to the respective data processing nodes by the data amounts corresponding to the data processing performance of the data processing nodes 111 to 114.

A block management unit 1016 manages the access of the tasks to be executed by the data processing nodes 111 to 114 to the data blocks stored in the data storage nodes.

Task management units 1012 of the data processing nodes 111 to 114 manage the execution order of the tasks allocated to the data processing nodes 111 to 114, and manage task allocation to the computing devices that execute the tasks.

A device selection unit 1013 selects the CPU, the FPGA, the GPU, the ASIC, or other computing devices as a computing device that executes the allocated task, on the basis of the task execution performance of each computing device determined by the task execution determination unit.

A logical data generation unit 1014 determines the amount of data that the task processes, on the basis of task execution performance when the selected computing device executes the task. The logical data generation unit 1014 then generates a logical data partition corresponding to the data amount, to thereby allocate the number of data blocks corresponding to the size of the generated partition.

A task execution unit 1015 executes the task allocated to the data processing node using the computing device selected as the device that executes the task in question, to thereby process the data block allocated to the partition associated with the task.

Figure 11A:
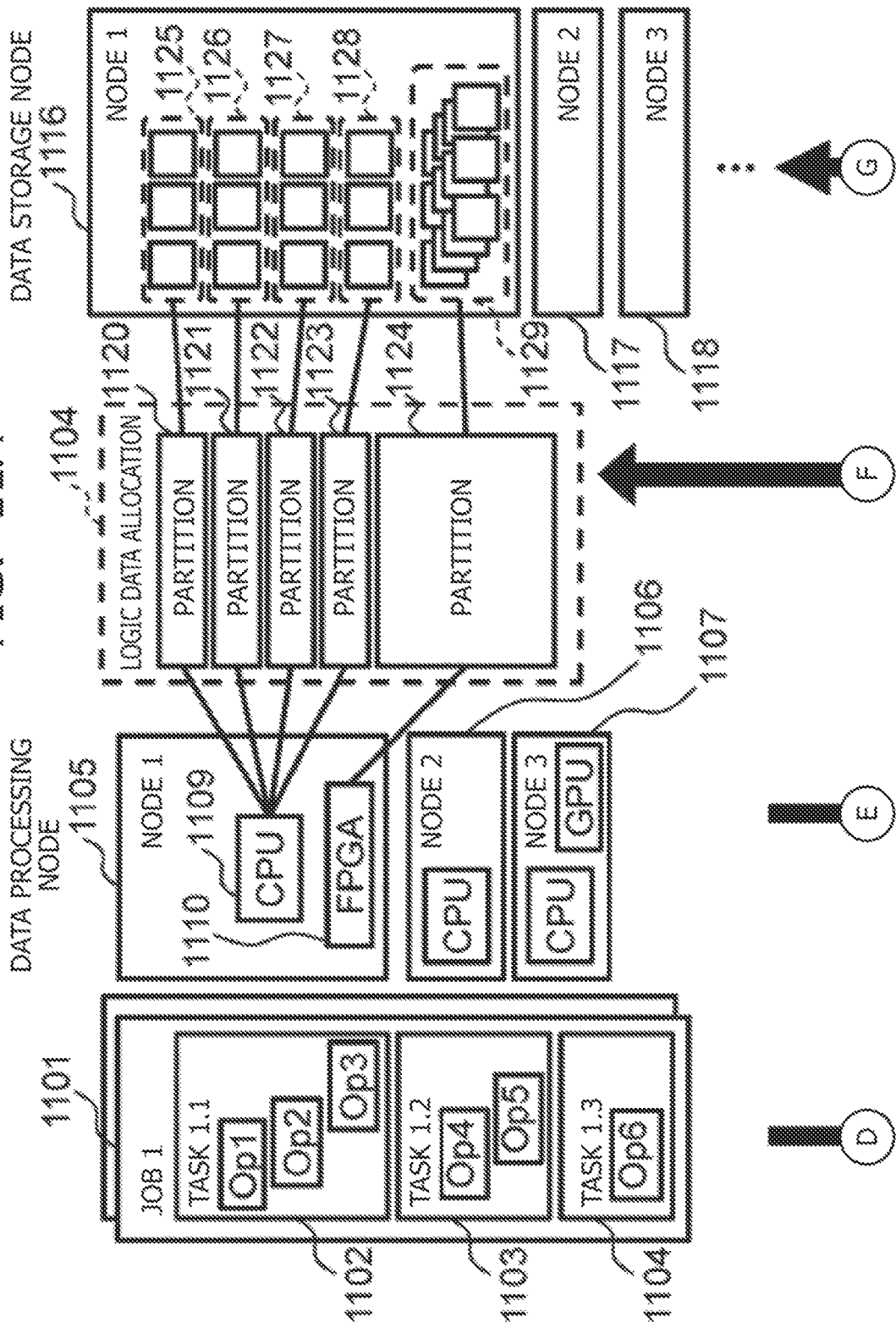
FIGS. 11A and 11B are diagrams illustrating a process of interpreting a command of a task allocated to the data processing node, determining the number of data blocks that the task executes, and allocating the data blocks to the data storage node that the data processing node accesses.
Figure 11B:
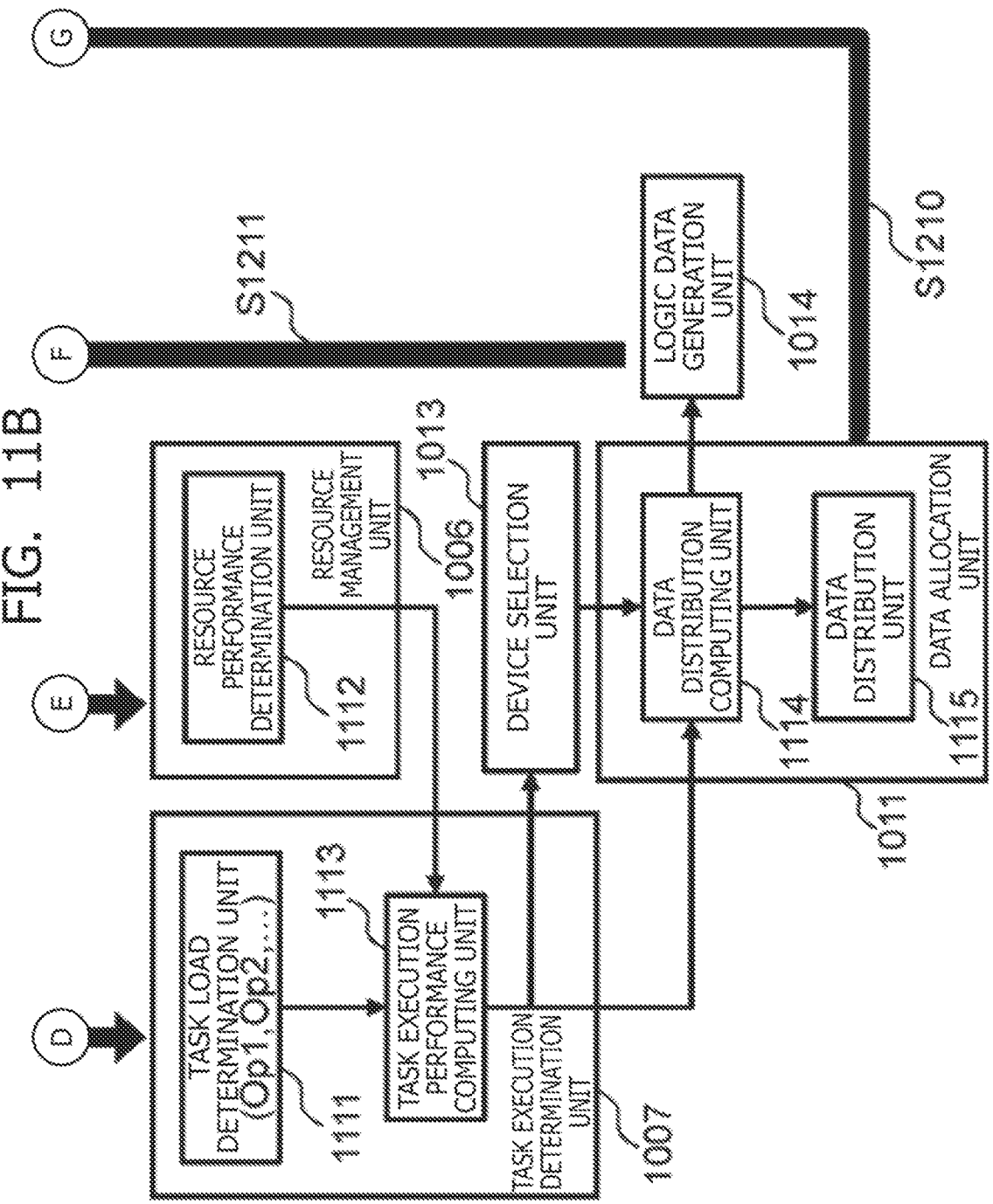
Figure 12A:
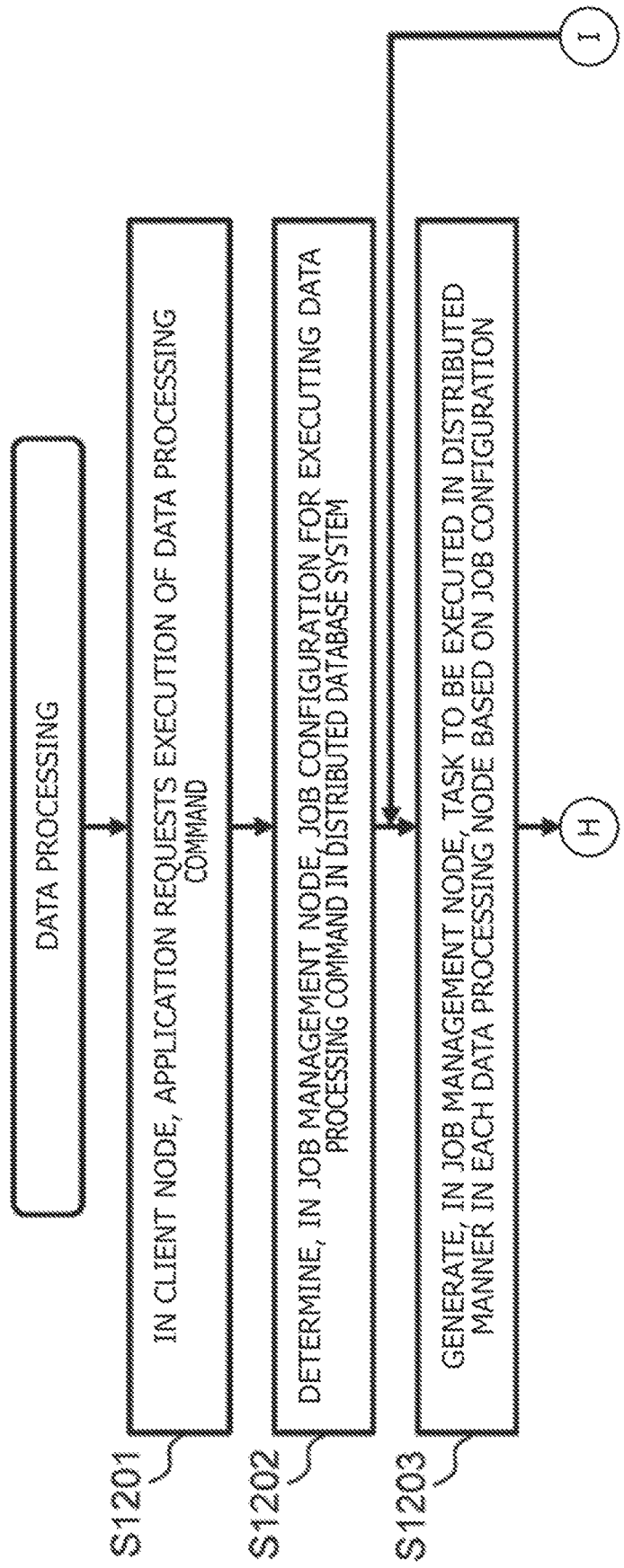
FIGS. 12A to 12C are flowcharts illustrating a method of adjusting a data distribution on the basis of the task execution performance of a computing device, thereby executing the task according to the present embodiment.
Figure 12B:
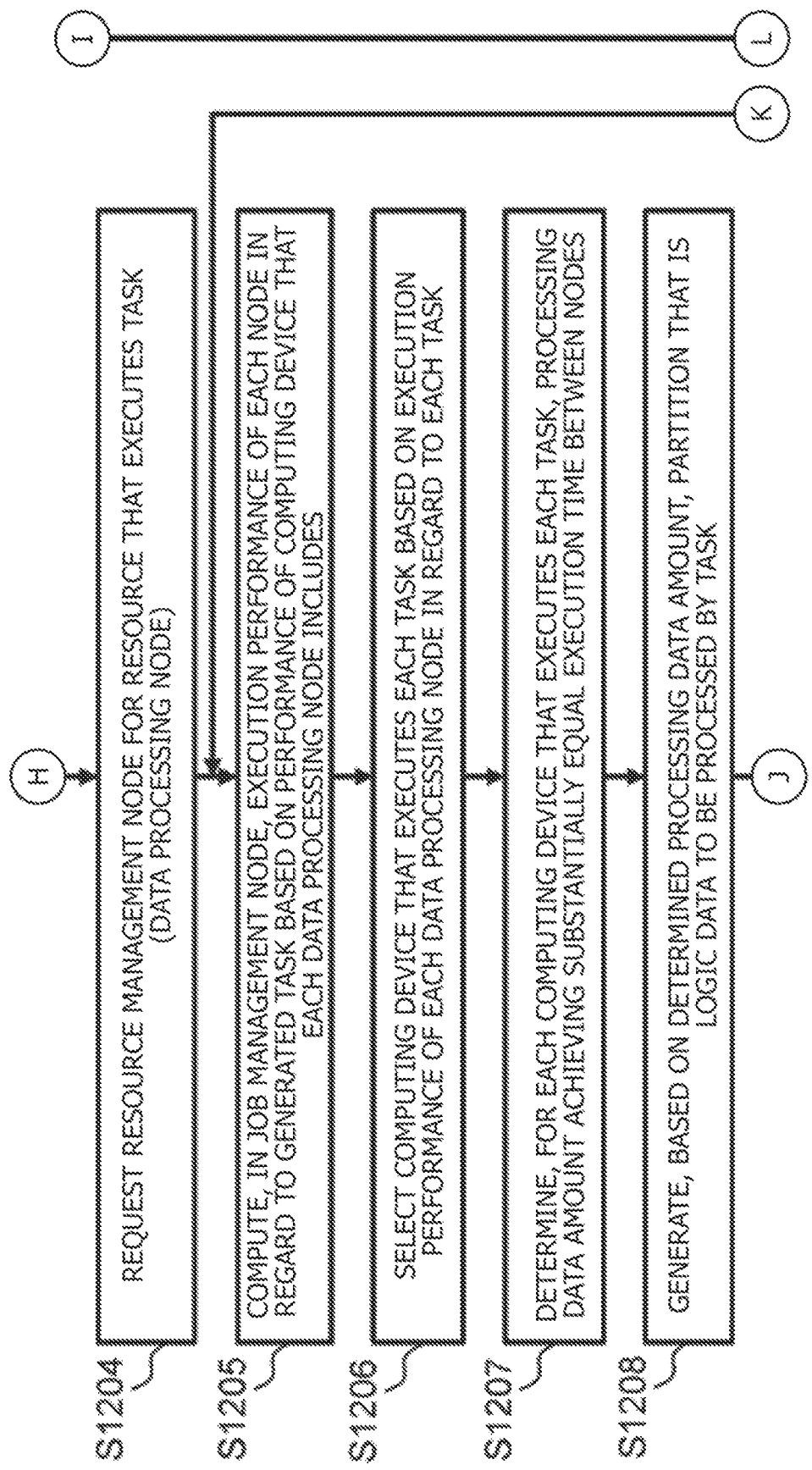
Figure 12C:
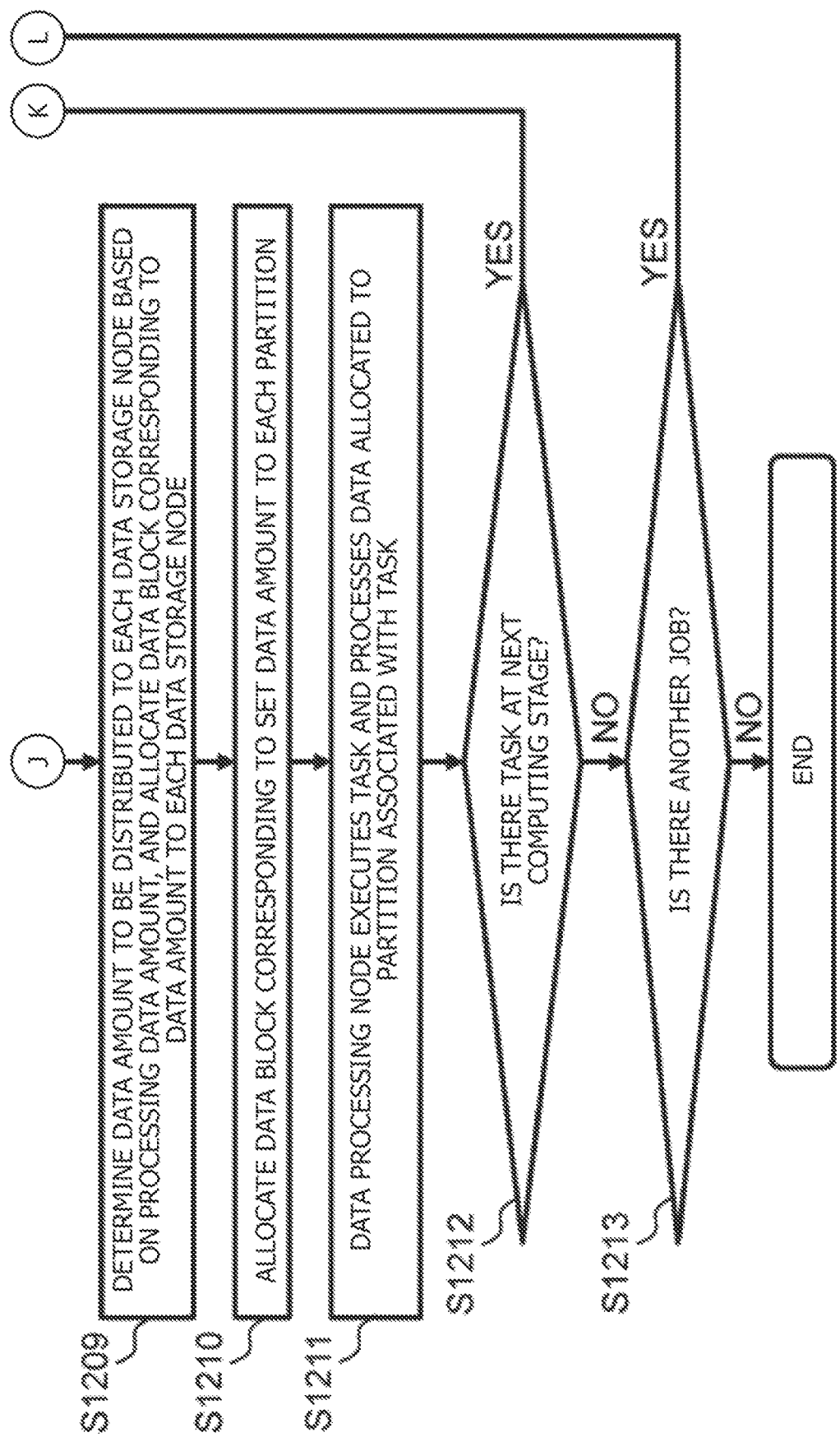

FIGS. 11A and 11B are diagrams illustrating a process of interpreting the command of the task allocated to a data processing node 1105, determining the number of data blocks that the task executes, and allocating the data blocks to a data storage node 1116 that the data processing node 1105 accesses.

In the example illustrated in FIGS. 11A and 11B, as a job configured to be executed in the distributed database system, a job 1 (corresponding to reference numeral 1101 in FIGS. 11A and 11B) is exemplified. The job 1 includes a task 1.1 (corresponding to reference numeral 1102 in FIGS. 11A and 11B), a task 1.2 (corresponding to reference numeral 1103 in FIGS. 11A and 11B), and a task 1.3 (corresponding to reference numeral 1104 in FIGS. 11A and 11B) as components. Further, in the example of the present embodiment, three data processing nodes and three data storage nodes are illustrated for description, but the numbers of the data processing nodes and the data storage nodes are not limited to three.

In the task execution determination unit 1007 illustrated in FIGS. 10A to 10C, a task load determination unit 1111 interprets commands (Op1 to Op6) of the task 1.1, the task 1.2, and the task 1.3, and determines a processing load such as a computing amount when each task is executed.

A resource performance determination unit 1112 of the resource management unit 1006 determines the data processing performance of each computing device on the basis of data processing performance information such as the operating frequencies, the number of parallel executions, and the memory bandwidths of the computing devices of data processing nodes 1105 to 1107, such as a CPU 1109 and an FPGA 1110.

A task execution performance computing unit 1113 computes task execution performance when each computing device executes each task, on the basis of the processing load of each task determined by the task load determination unit 1111 and the performance of each computing device determined by the resource performance determination unit 1112.

The device selection unit 1013 selects, on the basis of the computed task execution performance, an optimal device for executing the task in question. The optimal device can execute the task in the shortest time, for example.

To level the task execution times of the data processing nodes 1105 to 1107 on the basis of the task execution performance when the task is executed with the use of the selected device, a data distribution computing unit 1114 determines the data processing amount of each task, and the logical data generation unit 1014 creates partitions 1120 to 1124 for the respective tasks depending on the determined data processing amounts.

A data distribution unit 1115 stores, in each of the data storage nodes 1116 to 1118, the number of data blocks corresponding to the amount of data that the data processing node pairing to the data storage node processes.

To the partitions 1120 to 1124, data blocks 1125 to 1129 are allocated from the data storage nodes 1116 to 1118. The numbers of the data blocks 1125 to 1129 correspond to the data amounts.

FIGS. 12A to 14C illustrate an example of the resource management method according to the present embodiment. More specifically, in the example in FIGS. 12A to 14C, there is illustrated data distribution processing of adjusting a data distribution on the basis of the task execution performance of the computing device, thereby executing the task.

When the data processing starts, in the client node 101, the application execution unit 102A requests execution of a data processing command (Step S1201).

In the job management node 103, a job configuration for executing the data processing command in the distributed database system is determined on the basis of the data processing command issued by the application execution unit 102A (Step S1202).

In the job management node 103, a task to be executed in each data processing node in a distributed manner is generated on the basis of the determined job configuration (Step S1203), and the resource management node 104 is requested to use the data processing node having a resource that executes the task (Step S1204).

The job management node 103 computes the execution performance of each node in regard to the generated task on the basis of the performance of the computing device that each data processing node includes (Step S1205).

In addition, the job management node 103 selects the computing device that executes each task, on the basis of the execution performance of each data processing node in regard to the corresponding task (Step S1206).

The job management node 103 determines, for each computing device that executes the task, a processing data amount achieving substantially equal execution time between the nodes on the basis of these matters (Step S1207).

The resource management node 104 generates, on the basis of the processing data amount determined in this way, partitions being logical data each of which is processed by the task (Step S1208).

The data management node 105 allocates, on the basis of the amount of data to be processed by each task, the number of data blocks corresponding to the amount of data that the data processing node processes to each data storage node pairing to the corresponding data processing node (Step S1209).

The data management node 105 allocates, to each partition associated with the corresponding task, the number of data blocks corresponding to the data amount set to the partition (Step S1210).

Each of the data management nodes 105 executes the task and processes the data allocated to the partition associated with the task (Step S1211). When completing execution of the task, each of the data management nodes 105 determines whether there is a task at a next computing stage. When there is still a task to be executed next (Step S1212), the data management node 105 returns to Step S1205 to repeat the processing. When there is no task at the next computing stage, the data management node 105 determines whether there is another job to be executed.

When there is a job to be executed next, the data management node 105 returns to Step S1203 to repeat the processing. When there is not another job to be processed (Step S1213), the data management node 105 ends the processing.

FIG. 13 illustrates examples of execution times based on the processing load of each task determined by the task load determination unit 1111 in FIGS. 11A and 11B. Here, with reference to the examples in FIGS. 11A and 11B, the job 1 includes the three tasks of the task 1.1, the task 1.2, and the task 1.3 as the components. Further, a plurality of jobs to be executed in the distributed database system according to the present embodiment are not in a relationship of dependence and are independent of each other, and the computing devices mounted on the data processing nodes 1105 to 1107 are executable independently of each other. In addition, different kinds of tasks in the same job cannot be executed in parallel, and after a preceding task is complete, execution of a next task can start in the order of the task 1.1, the task 1.2, and the task 1.3.

At this time, in the table of FIG. 13, with a processing load when the task 1.1 processes the data of 100 GB, one core of the CPU takes an execution time of 1,000 ms for the execution with an operating frequency of 1 GHz. Further, the execution time is 1 ms when the task 1.1 is processed by the FPGA while the execution time is 10 ms when the task 1.1 is executed by the GPU. The cases of the task 1.2 and the task 1.3 are illustrated in the table.

However, the task 1.2 is not executable by the GPU due to the task processing characteristics. The task 1.3 is not executable by the FPGA. These numerical values may be estimated on the basis of a performance model generated from the processing contents of the task programs or can be converted from results obtained by actually executing the tasks by a specific computing device in advance.

FIG. 14 illustrates configuration examples of the computing devices mounted on the data processing nodes 1105 to 1107, which are illustrated in FIGS. 11A and 11B and other figures. It is illustrated that on a node 1, one 20-core CPU (operating frequency: 4 GHz), one FPGA, and one GPU are mounted, for example.

FIG. 15 illustrates examples of results obtained by the task execution performance computing unit 1113 in FIGS. 11A and 11B computing the task execution time of each computing device on the basis of FIG. 13 and FIG. 14.

For example, an execution time Time required for the CPU of the node 1 to execute the task 1.1 is computed as follows.

Time (task 1.1, node 1, CPU)=1,000/20/4=12.5 ms

For example, an execution time Time required for the FPGA or the GPU of the node 1 to execute the task 1.1 can be similarly computed as follows.

Time (task 1.1, node 1, FPGA)=1 ms

Time (task 1.1, node 1, GPU)=5 ms

From the foregoing, when the node 1 executes the task 1.1, the processing is complete in the shortest execution time if the FPGA is used, and hence the FPGA is selected as the computing device. Cases where a node 2 and a node 3 execute the task 1.1 are illustrated in FIG. 15.

FIG. 16 is an example illustrating task execution times when optimal computing devices are selected for each task in each node. The execution time is computed on the basis of the method described with reference to FIG. 15. When the data of 100 GB are processed, in the node 1, the task 1.1 is executed with the use of the FPGA in an execution time of 1 ms, the task 1.2 is executed with the use of the CPU in an execution time of 6.25 ms, and the task 1.3 is executed with the use of the CPU in an execution time of 5 ms. The cases of the node 2 and the node 3 are also illustrated in the table.

FIG. 17 illustrates the comparison of the execution times in FIG. 16 with the use of data processing performance (TB/s). FIG. 18 illustrates data distribution amounts when the execution times of the nodes are levelled with the use of the resource management method according to the present embodiment in a case where the data of 1 TB (terabytes) are processed by the three data processing nodes as the data source.

For example, in regard to the task 1.1, the computing performance ratio of the node 1, the node 2, and the node 3 is 10:2:0.2 from FIG. 17. Thus, when the data of 1 TB=1,024 GB are distributed at the ratio, the following is satisfied in the node 1.

Data distribution amount (node 1)=1,024×10/(10+2+ 0.2)=839 GB

In a similar manner, 168 GB is allocated to the node 2 while 17 GB is allocated to the node 3. Then, the processing of the task 1.1 completes in the same execution time in all the nodes. The cases of the task 1.2 and the task 1.3 are illustrated in the table of FIG. 18.

FIGS. 19A to 19C illustrate effects obtained by adjusting the data distribution depending on the computing performance of the data processing nodes through resource management processing according to the present embodiment.

FIG. 19A illustrates the execution times of each task when data are evenly distributed to all the data processing nodes by 333 GB without the data distribution adjustment.

The task 1.1, the task 1.2, and the task 1.3 are executed under the condition that after a preceding task is complete, execution of a next task starts. Thus, even though the processing of each task is complete early in the node 1 and the node 2, the system waits until the processing in the node 3 is complete. This means that the rate of the processing time of the whole system is limited by the execution performance of the node 3.

In contrast to this, in FIG. 19B, the data distribution illustrated in the table of FIG. 18 is performed for each task, and hence the execution times of the tasks are levelled between the nodes, with the result that there is no waiting time and the execution time of the whole system is thus greatly reduced.

FIG. 19C illustrates a case where, instead of optimizing the data distribution for each task, the data are distributed on the basis of the geometric mean of the execution performance of each node in regard to the tasks 1.1, 1.2, and 1.3 (described in the geometric mean section of the table of FIG. 17) (described in the geometric mean section of the table of FIG. 18).

In this case, the same data distribution is used irrespective of the tasks to be executed. When the data are distributed with the use of, for example, the data distribution function of an HDFS that is a Hadoop (registered trademark) distributed file system, the data are transferred to the data storage node, and hence the overhead time of the data transfer may affect the execution time of the whole system if the data distribution is performed every time the task is executed.

In view of this, in the present embodiment, when the effect of the data transfer overhead is large, a plurality of tasks to be executed may be subjected to a suboptimal data distribution in advance so that the effect of the data transfer overhead is avoided in the task execution.

In FIG. 19C, there is a little waiting time for each task, but the execution time of the whole system is sufficiently shorter than that in the case in FIG. 19A where the data are evenly allocated.

In the present embodiment, the geometric mean of the task execution performance is used as the data distribution ratio, but the method of determining a distribution ratio is not limited to the geometric mean, and an optimal computing method can be selected depending on task characteristics from the arithmetic mean and the harmonic mean, for example.

In the distributed database system according to the present embodiment, as the resource management method therefor, the method of distributing, when the task is executed with the use of the computing device of the data processing node, the amount of data that the task processes depending on the task execution performance is described so far. Instead of distributing the data amount depending on the task execution performance in this way, the execution performance of the task may be adjusted depending on the amount of data distributed in advance.

For example, in execution of a specific task, when a node including a CPU having a high operating frequency or a CPU including many cores executes the task, and the node in question has a waiting time because the task execution time of the node is shorter than that of another node, the execution times are levelled over the whole system by lowering the operating frequency or limiting the number of cores to be used, for example. In addition, the power consumption of the specific node can be reduced or the license fee of the database software can be cut.

Further, the following is conceivable when the FPGA is used as the computing device: lowering the degree of parallelism of a logic circuit configured to execute a target task or reducing the logic circuit scale, for example, to thereby level the task execution performance with that of another without-FPGA data processing node while reducing the power consumption or adding a logic configured to execute another processing, for example, to thereby improve the functionality of the system.

In the example described in the present embodiment, the task execution time is used as the evaluation criterion of the computing power. However, the job execution may be optimized with evaluation criteria including performance indices such as a data transfer amount, a network load, and a memory use amount in the task execution, the amount of electric power to be used in the task execution, or computing resource usage fees, for example.

(2) Effects and Other Matters of Present Embodiment

As described above, the distributed database system according to the above-mentioned embodiment distributes, when the task is executed with the use of the plurality of optimal computing devices, the data amount of the data to be processed with the processing command of the task for the plurality of optimal computing devices depending on a difference in computing power between the plurality of optimal computing devices, to thereby execute the task in a distributed manner with the use of the plurality of optimal computing devices.

With such a configuration, it is possible to distribute the data amount of processing target data depending on the computing power of each data processing node, and therefore shorten the data processing execution time taken by the whole system.

(3) Another Embodiment

The embodiment described above is an example for describing the present invention, and the present invention is not intended to be limited to these embodiments. The present invention can be implemented in various modes as long as they do not deviate from the gist of the present invention. For example, in the above-mentioned embodiment, the processing processes of the various programs are described sequentially, but the present invention is not particularly limited thereto. As long as processing results are consistent, the processing order may be changed or the processing processes may be executed in parallel.

INDUSTRIAL APPLICABILITY

The present invention is widely applicable to a resource management method for data analysis processing using a distributed database system.

DESCRIPTION OF REFERENCE CHARACTERS

1007: Task execution determination unit
1008: Task distribution unit

1011: Data allocation unit
1014: Logical data generation unit
1111: Task load determination unit
1112: Resource performance determination unit
1113: Task execution performance computing unit
1114: Data distribution computing unit
1115: Data distribution unit

The invention claimed is:

1. A distributed database system including one or more data processing nodes each including one or more computing devices configured to process data, the distributed database system comprising:
   a control unit operating within a processor and associated with a memory to:
   measure a computing power of each of the one or more computing devices of each of the one or more data processing nodes;
   determine for each of the one or more data processing nodes, one of the one or more computing devices with a highest computing power based on the computing power measured, and
   each of the one of the one or more computing devices with the highest computing power being an optimal computing device;
   determine, when a task is executed using the optimal computing devices, a processing data amount of the data to be processed with a processing command of the task for the optimal computing devices, such that each of the one or more data processing nodes executes the task in a timeframe, to thereby allow the task to be executed in a distributed manner using the plurality of optimal computing devices;
   generate partitions based on the processing data amount determined,
   determine a data amount, for distribution to each of the one or more data processing nodes;
   distribute data blocks to the partitions, based on the data amount determined; and
   execute, via the optimal computing devices, the task and process the data blocks distributed to the partitions.

2. The distributed database system according to claim 1, wherein
   each of the one or more computing devices is an accelerator configured to process the task.

3. The distributed database system according to claim 2, wherein
   each of the one or more computing devices is any one of or a combination of any one of a CPU, an FPGA, a GPU, and an ASIC.

4. The distributed database system according to claim 1, wherein
   the device selection unit is further configured to allow the task to be executed in a distributed manner using the one or more computing devices mounted on a plurality of the one or more data processing nodes.

5. The distributed database system according to claim 1, wherein
   the device selection unit is further configured to allow the task to be executed in a distributed manner using a plurality of the one or more computing devices mounted on one of the one or more data processing nodes.

6. The distributed database system according to claim 1, wherein
   the device selection unit is further configured to:
   determine a task load by interpreting the processing command of the task;
   determine resource performance of each of the one or more computing devices; and
   when the task is executed using the optimal computing devices, determining the processing data amount of the data to be processed with the processing command of the task for the optimal computing devices depending on a task execution performance ratio based on the task load and the resource performance, to thereby allow the task to be executed in a distributed manner using the optimal computing devices.

7. The distributed database system according to claim 6, wherein
   when distributing the data amount determined based on the task execution performance ratio, the data blocks are distributed based on a mean value of the task execution performance.

8. The distributed database system according to claim 7, wherein
   the device selection unit is further configured to derive the mean value using a geometric mean.

9. A resource management method for a distributed database system including one or more data processing nodes each including one or more computing devices configured to process data and a control unit, the resource management method comprising:
   measuring, by the control unit, a computing power of each of the one or more computing devices of each of the one or more data processing nodes;
   determining, by the control unit, for each of the one or more data processing nodes, one of the one or more computing devices with a highest computing power based on the computing power measured, and each of the one of the one or more computing devices with the highest computing power being an optimal computing device;
   determining, by the control unit, when a task is executed using the optimal computing devices, a processing data amount of the data to be processed with a processing command of the task for the optimal processing devices, such that each of the one or more data processing nodes executes the task in a predetermined timeframe, to thereby allow the task to be executed in a distributed manner using the optimal computing devices;
   generating, by the control unit, partitions based on the processing data amount determined;
   determining, by the control unit, a data amount for distribution to each of the one or more data processing nodes;
   distributing, by the control unit, data blocks to the partitions based on the data amount determined; and
   executing, by the optimal computing devices, the task and processing the data blocks distributed to the partitions.

10. The resource management method for a distributed database system according to claim 9, wherein the method further comprises:
    allowing, by the control unit, the task to be executed in a distributed manner using the one or more computing devices mounted on a plurality of the one or more data processing nodes.

11. The resource management method for a distributed database system according to claim 9, wherein the method further comprises:
    allowing, by the control unit, the task to be executed in a distributed manner using a plurality of the one or more computing devices mounted on one of the one or more data processing nodes.

12. The resource management method for a distributed database system according to claim 9, wherein the method further comprises:
- determining, by the control unit, a task load by interpreting the processing command of the task;
- determining, by the control unit, resource performance of each of the one or more computing devices; and
- determining, by the control unit, when the task is executed using the plurality of optimal computing devices, the processing data amount of the data to be processed with the processing command of the task for the optimal computing devices depending on a task execution performance ratio based on the task load and the resource performance, to thereby allow the task to be executed in a distributed manner using the optimal computing devices.

13. The resource management method for a distributed database system according to claim 12, wherein
- when distributing, by the control unit, the data amount determined based on the task execution performance ratio, the data blocks are distributed based on a mean value of the task execution performance.

14. The resource management method for a distributed database system according to claim 13, wherein the method further comprises:
- deriving, by the control unit, the mean value using a geometric mean.

* * * * *